(12) United States Patent
McElhinney et al.

(10) Patent No.: US 10,510,006 B2
(45) Date of Patent: Dec. 17, 2019

(54) HANDLING OF PREDICTIVE MODELS BASED ON ASSET LOCATION

(71) Applicant: Uptake Technologies, Inc., Chicago, IL (US)

(72) Inventors: Adam McElhinney, Chicago, IL (US); John Boueri, Chicago, IL (US); Timothy Stacey, Chicago, IL (US)

(73) Assignee: Uptake Technologies, Inc., Chicago, IL (US)

( * ) Notice: Subject to any disclaimer, the term of this patent is extended or adjusted under 35 U.S.C. 154(b) by 929 days.

(21) Appl. No.: 15/064,878

(22) Filed: Mar. 9, 2016

(65) Prior Publication Data

US 2017/0262756 A1 Sep. 14, 2017

(51) Int. Cl.
| | |
|---|---|
| *G06N 5/02* | (2006.01) |
| *G01M 99/00* | (2011.01) |
| *G08G 9/00* | (2006.01) |
| *G06Q 10/08* | (2012.01) |
| *G06N 20/00* | (2019.01) |
| *G05B 23/02* | (2006.01) |
| *G08G 1/00* | (2006.01) |
| *G08G 5/00* | (2006.01) |

(52) U.S. Cl.
CPC .......... *G06N 5/022* (2013.01); *G01M 99/008* (2013.01); *G05B 23/0283* (2013.01); *G06N 20/00* (2019.01); *G06Q 10/08* (2013.01); *G08G 9/00* (2013.01); *G08G 1/205* (2013.01); *G08G 5/0013* (2013.01); *G08G 5/0082* (2013.01)

(58) Field of Classification Search
CPC combination set(s) only.
See application file for complete search history.

(56) References Cited

U.S. PATENT DOCUMENTS

| | | | |
|---|---|---|---|
| 5,566,092 A | 10/1996 | Wang et al. | |
| 5,633,800 A | 5/1997 | Bankert et al. | |
| (Continued) | | | |

FOREIGN PATENT DOCUMENTS

| | | |
|---|---|---|
| JP | 2013025660 A | 2/2013 |
| KR | 20120108625 A | 10/2012 |
| (Continued) | | |

OTHER PUBLICATIONS

IEEE Cloud-Based Cyber-Physical Intrusion Detection for Vehicles Using Deep Learning, George Loukas; uan Vuong; Ryan Heartfield; Georgia Sakellar; Yongpil Topic: Security Analytics and Intelligence for Cyber Physical Systems Published in: IEEE Access ( vol. 6 pp. 3491-3508.*

(Continued)

*Primary Examiner* — Michael B Holmes
(74) *Attorney, Agent, or Firm* — Lee Sullivan Shea & Smith LLP

(57) ABSTRACT

Disclosed herein is a computer architecture and software that is configured to modify handling of predictive models by an asset-monitoring system based on a location of an asset. In accordance with example embodiments, the asset-monitoring system may maintain data indicative of a location of interest that represents a location in which operating data from assets should be disregarded. The asset-monitoring system may determine whether an asset is within the location of interest. If so, the asset-monitoring system may disregard operating data for the asset when handling a predictive model related to the operation of the asset.

20 Claims, 18 Drawing Sheets

(56) References Cited

U.S. PATENT DOCUMENTS

| | | |
|---|---|---|
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,050 B2 * | 2/2014 | Gontmakher ......... G08G 1/127 340/994 |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 9,471,452 B2 * | 10/2016 | McElhinney ....... G06F 11/0751 |
| 9,864,665 B2 * | 1/2018 | McElhinney ....... G06F 11/0751 |
| 9,910,751 B2 * | 3/2018 | McElhinney ....... G06F 11/0751 |
| 10,176,032 B2 * | 1/2019 | Horrell ............. G06F 11/0751 |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2008/0071501 A1 | 3/2008 | Herzog |
| 2008/0107037 A1 | 5/2008 | Forbes et al. |
| 2008/0208487 A1 | 8/2008 | General Electric Company |
| 2009/0002148 A1 | 1/2009 | Horvitz |
| 2011/0133888 A1 | 6/2011 | Stevens et al. |
| 2012/0092180 A1 | 4/2012 | Rikkola et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0281713 A1 | 9/2014 | Hampapur et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0025695 A1 | 1/2015 | Process Systems Enterprise Limited |
| 2015/0046870 A1 | 2/2015 | Goldenberg et al. |
| 2015/0262060 A1 | 9/2015 | Husain et al. |
| 2016/0054200 A1 | 2/2016 | Kabushiki Kaisha Kobe Seiko Sho |

FOREIGN PATENT DOCUMENTS

| | | |
|---|---|---|
| WO | 2011117570 | 9/2011 |
| WO | 2013034420 | 3/2013 |
| WO | 2014145977 | 9/2014 |
| WO | 2014205497 | 12/2014 |

OTHER PUBLICATIONS

Biswas, "Redundancy-based Approaches in Wireless Multihop Network Design", PhD Dissertation Submitted to Graduate Faculty of North Carolina State University (2014).

Isermann, "Model-based Fault Detection and Diagnosis—Status and Applications", Institute of Automatic Control, Darmstadt University of Technology (2004).

(56) References Cited

OTHER PUBLICATIONS

Narasimhan et al, "Combining Model-Based and Feature-Driven Diagnosis Approaches—A Case Study on Electromechanical Actuators", 21st International Workshop on Principles of Diagnosis (2010).
Prentzas et al, Categorizing Approaches Combining Rule-Based and Case-Based Reasoning.
Infor M3 Enterprise Management System, Infor.com (2014).
Infor Equipment, Infor.com (2012).
Infor Introduces Next-Generation Solution for Equipment Dealers and Service Providers, Inforcom (Feb. 20, 2014).
Infor Equipment for Rental, Inforcom (2013).
Waltermire et al, Applying the Continuous Monitoring Technical Reference Model to the Asset, Configuration, and Vulnerability Management Domains (DRAFT), NIST (Jan. 2012).
International Searching Authority International Search Report and Written Opinion dated Jun. 7, 2017, issued in connection with PCT/US2017/021407, filed on Mar. 8, 2017, 11 pages.
European Patent Office Extended Search Report for EP Application No. 17764017.4 dated Oct. 2, 2019, 10 pages.

\* cited by examiner

HANDLING OF PREDICTIVE MODELS BASED ON ASSET LOCATION

CROSS-REFERENCE TO RELATED APPLICATIONS

This application incorporates by reference each of the following patent applications in its entirety: U.S. Non-Provisional patent application Ser. No. 14/732,258, filed on Jun. 5, 2015, entitled Asset Health Score and U.S. Non-Provisional patent application Ser. No. 14/963,207, filed on Dec. 8, 2015, entitled Local Analytics at an Asset.

BACKGROUND

Today, machines (also referred to herein as "assets") are ubiquitous in many industries. From locomotives that transfer cargo across countries to construction equipment that helps build homes and cities, assets serve an important role in everyday life. Depending on the role that an asset serves, its complexity, and cost, may vary. For instance, some assets may include multiple subsystems that must operate in harmony for the asset to function properly (e.g., an engine, transmission, etc. of a locomotive).

Because of the key role that assets play in everyday life, it is desirable for assets to be repairable with limited downtime. Accordingly, some have developed mechanisms to monitor and detect abnormal conditions within an asset to facilitate repairing the asset, perhaps with minimal downtime.

OVERVIEW

The current approach for monitoring assets generally involves an on-asset computer that receives operating data in the form of signals from various sensors and/or actuators distributed throughout an asset that monitor the operating conditions of the asset. As one representative example, if the asset is a locomotive, the sensors and/or actuators may monitor parameters such as temperatures, voltages, and speeds, among other examples. If sensor and/or actuator signals from one or more of these devices reach certain values, the on-asset computer may then generate an abnormal-condition indicator, such as a "fault code," which is an indication that an abnormal condition has occurred within the asset.

In general, an abnormal condition may be a defect at an asset or component thereof, which may lead to a failure of the asset and/or component. As such, an abnormal condition may be associated with a given failure, or perhaps multiple failures, in that the abnormal condition is symptomatic of the given failure or failures. In practice, a user typically defines the sensors and respective sensor values associated with each abnormal-condition indicator. That is, the user defines an asset's "normal" operating conditions (e.g., those that do not trigger fault codes) and "abnormal" operating conditions (e.g., those that trigger fault codes).

The on-asset computer may also provide sensor data, actuator data, and/or abnormal-condition indicator data to another computing system or device, which may then perform further processing on such data. For instance, a remote asset-monitoring system may use certain data received from an asset as training data for defining (or modifying) a predictive model and/or as input data for executing a predictive model for the asset. Additionally or alternatively, a local asset-monitoring system may use certain asset data to perform some or all of these data processing operations at the asset itself.

In general, an asset-monitoring system handles predictive models based on operating data for one or more assets as those one or more assets operate under real-world conditions. That is, an asset-monitoring system typically handles predictive models based on operating data that reflects how assets function out in the field. However, an asset-monitoring system typically receives operating data for the one or more assets without knowledge of the context in which the one or more assets are operating. For example, the asset-monitoring system may be unaware that operating data for an asset corresponds to a "representative" or "non-representative" context.

Thus, at times, an asset-monitoring system may unknowingly receive data for an asset that may be unreliable in handling predictive models. For example, an asset may be at a repair shop/yard where diagnostics or other troubleshooting tools may be run on the asset, which may cause the asset to output non-representative operating data. In another example, an asset may be located somewhere that temporarily causes the asset to operate in a non-representative manner, such as in tunnel or some other confined area, which could likewise cause the asset to output non-representative operating data that may skew the training, modification, and/or output of a predictive model. Other examples of non-representative contexts are possible as well.

Unfortunately, current asset-monitoring systems typically receive operating data for assets without knowledge of whether or not such data is representative of "normal" operation and thus can be reliably used to define, modify, and/or execute a predictive model. In fact, current asset-monitoring systems typically do not keep track of which locations are associated with non-representative operating data, such as repair shops, tunnels, or the like. As a result, current asset-monitoring systems may unknowingly use unreliable operating data to define, modify, and/or execute a predictive model, which may lead to inaccurate models and/or model outputs, among other disadvantages.

The example systems, devices, and methods disclosed herein seek to help address one or more of these issues. In example implementations, one or more assets may communicate with one or more asset-monitoring systems, which may be remote from the one or more assets or may be local to at least one asset.

As noted above, each asset may include multiple sensors and/or actuators distributed throughout the asset that facilitate monitoring operating conditions of the asset. A number of assets may provide respective data indicative of each asset's operating conditions to the asset-monitoring system, which may be configured to perform one or more actions based on the provided data.

In example implementations, the asset-monitoring system may be configured to define one or more predictive models that are related to the operation of the assets and then operate in accordance with the one or more predictive models. In general, each such predictive model may receive as inputs data from a particular asset and output a likelihood that at least one event of a given group of events will occur at the asset within a particular period of time in the future. (For purposes of this disclosure, it should be understood that a "group of events" may include either a single event or a plurality of events). As one particular example, the predictive model may output a likelihood that at least one failure event will occur at an asset within a particular period of time in the future. Such a model may be referred to herein as a "failure model." As another example, the predictive models may predict the likelihood that an asset will complete a task within a particular period of time in the future. Other examples of predictive models for an asset may exist as well.

In practice, a predictive model may be defined based on historical data for one or more assets. At a minimum, this historical data may include operating data that indicates operating conditions of a given asset, such as abnormal-condition data identifying instances when faults occurred at assets and/or sensor/actuator data indicating one or more physical properties measured at the assets around the time of those instances.

As mentioned above, there may be times when it is undesirable for a remote asset-monitoring system (and/or a local asset-monitoring system) to use operating data for an asset as it normally would, for example, in the process of defining, modifying, and/or executing a predictive model. One such time might be when the asset is located at a particular type of location, such as a repair shop, a tunnel, or other non-representative locations, where assets tend to generate unreliable operating data.

Accordingly, in example embodiments, an asset-monitoring system may be configured to maintain data indicative of one or more locations of interest. Generally, a location of interest represents a location where assets' operating data may be unreliable and should be disregarded. For example, a location of interest may be a location where assets are being tested or otherwise being forced to operate in an non-representative way (e.g., asset repair shops/yards) or a location where asset-operating conditions become temporarily non-representative due to external conditions (e.g., inside a tunnel), among other examples.

The asset-monitoring system may be configured to maintain locations of interest in a variety of manners. In example embodiments, the asset-monitoring system may receive from another system or device data indicative of one or more locations of interest. In such embodiments, the other system or device may be involved with defining the locations of interest prior and then provide the data indicative of the defined locations of interest to the asset-monitoring system.

In other example embodiments, the asset-monitoring system maintaining the locations of interest may involve the asset-monitoring system itself defining the locations of interest, which may be performed in a variety of manners. In one example implementation, the asset-monitoring system may define a location of interest based at least on historical position data for a plurality of assets. For example, based on such data, the asset-monitoring system may identify locations where assets tend to "cluster," identify certain further asset-related information associated with the clusters, and infer that these clusters correspond to locations of interest. Other examples of defining locations of interest are also possible.

In any event, while maintaining the data indicative of the one or more locations of interest, the asset-monitoring system may be operating such that the asset-monitoring system uses operating data for one or more assets in connection with a predictive model related to the operation of the asset. While operating in this manner, the asset-monitoring system may then determine that position data for a particular asset of the one or more assets matches one of the locations of interest.

Based on that determination, the asset-monitoring system may transition to operate in a manner in which the asset-monitoring system disregards operating data for the particular asset when the asset-monitoring system handles predictive models related to the operation of the asset. For example, the asset-monitoring system may define, modify, and/or execute such predictive models without considering operating data for the given asset that the asset-monitoring system receives after the determination or without considering any operating data for the given asset that corresponds to the position data that matched the location of interest, among other examples. In this way, the asset-monitoring system may disregard operating data for an asset that may be in a non-representative location where assets typically output unreliable data, thereby helping to maintain the integrity of the predictive model for other assets and/or for future executions of the predictive model for the particular asset.

Accordingly, in one aspect, disclosed herein is a method for handling operating data for an asset based on position data of the asset, where the method comprises a computing system (i) receiving, for each of a plurality of assets, position data, (ii) determining that given position data for a given asset of the plurality of assets matches a location associated with unreliable operating data, (iii) in response to the determination, deciding to disregard operating data for the given asset when handling a predictive model related to the operation of the plurality of assets, and (iv) handling the predictive model in accordance with the decision.

In another aspect, disclosed herein is a computing system that comprises (a) at least one processor, (b) a non-transitory computer-readable medium, and (c) program instructions stored on the non-transitory computer-readable medium that are executable by the at least one processor to cause the computing system to carry out functions disclosed herein for handling operating data for an asset based on position data of the asset.

In yet another aspect, disclosed herein is a non-transitory computer-readable medium having instructions stored thereon, where the instructions are executable by a processor to cause a computing system to carry out functions disclosed herein for handling operating data for an asset based on position data of the asset.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
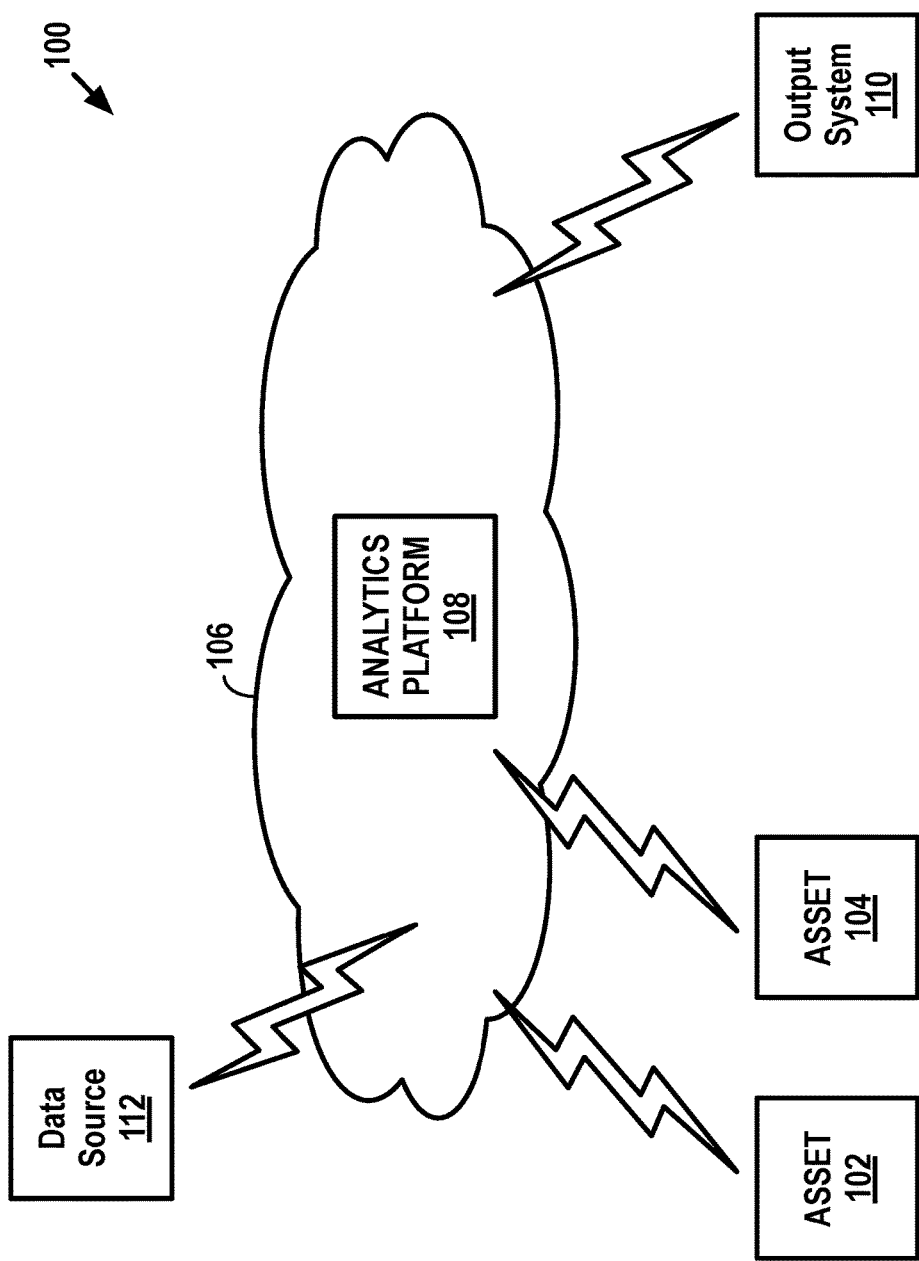
FIG. 1 depicts an example network configuration in which example embodiments may be implemented.

Turning now to the figures, FIG. 1 depicts an example network configuration 100 in which example embodiments may be implemented. As shown, the network configuration 100 includes an asset 102, an asset 104, a communication network 106, a remote computing system 108 that may take the form of an analytics platform, an output system 110, and a data source 112.

The communication network 106 may communicatively connect each of the components in the network configuration 100. For instance, the assets 102 and 104 may communicate with the analytics platform 108 via the communication network 106. In some cases, the assets 102 and 104 may communicate with one or more intermediary systems, such as an asset gateway (not pictured), that in turn communicates with the analytics platform 108. Likewise, the analytics platform 108 may communicate with the output system 110 via the communication network 106. In some cases, the analytics platform 108 may communicate with one or more intermediary systems, such as a host server (not pictured), that in turn communicates with the output system 110. Many other configurations are also possible. In example cases, the communication network 106 may facilitate secure communications between network components (e.g., via encryption or other security measures).

In general, the assets 102 and 104 may take the form of any device configured to perform one or more operations (which may be defined based on the field) and may also include equipment configured to transmit data indicative of one or more operating conditions of the given asset. In some examples, an asset may include one or more subsystems configured to perform one or more respective operations. In practice, multiple subsystems may operate in parallel or sequentially in order for an asset to operate.

Example assets may include transportation machines (e.g., locomotives, aircraft, passenger vehicles, semi-trailer trucks, ships, etc.), industrial machines (e.g., mining equipment, construction equipment, processing equipment, assembly equipment, etc.), and unmanned aerial vehicles, among other examples. Those of ordinary skill in the art will appreciate that these are but a few examples of assets and that numerous others are possible and contemplated herein.

In example implementations, the assets 102 and 104 may each be of the same type (e.g., a fleet of locomotives or aircrafts, among other examples) and perhaps may be of the same class (e.g., same equipment type, brand, and/or model). In other examples, the assets 102 and 104 may differ by type, by brand, by model, etc. For example, assets 102 and 104 may be different pieces of equipment at a job site (e.g., an excavation site) or a production facility, among numerous other examples. The assets are discussed in further detail below with reference to FIG. 2.

As shown, the assets 102 and 104, and perhaps the data source 112, may communicate with the analytics platform 108 via the communication network 106. In general, the communication network 106 may include one or more computing systems and network infrastructure configured to facilitate transferring data between network components. The communication network 106 may be or may include one or more Wide-Area Networks (WANs) and/or Local-Area Networks (LANs), which may be wired and/or wireless and may support secure communication. In some examples, the communication network 106 may include one or more cellular networks and/or the Internet, among other networks. The communication network 106 may operate according to one or more communication protocols, such as LTE, CDMA, GSM, LPWAN, WiFi, Bluetooth, Ethernet, HTTP/S, TCP, CoAP/DTLS and the like. Although the communication network 106 is shown as a single network, it should be understood that the communication network 106 may include multiple, distinct networks that are themselves communicatively linked. The communication network 106 could take other forms as well.

As noted above, the analytics platform 108 (sometimes referred to herein as a "remote-asset monitoring system") may be configured to receive data from the assets 102 and 104 and the data source 112. Broadly speaking, the analytics platform 108 may include one or more computing systems, such as servers and databases, configured to receive, process, analyze, and output data. The analytics platform 108 may be configured according to a given dataflow technology, such as TPL Dataflow or NiFi, among other examples. The analytics platform 108 is discussed in further detail below with reference to FIG. 4.

As shown, the analytics platform 108 may be configured to transmit data to the assets 102 and 104 and/or to the output system 110. The particular data transmitted may take various forms and will be described in further detail below.

In general, the output system 110 may take the form of a computing system or device configured to receive data and provide some form of output. The output system 110 may take various forms. In one example, the output system 110 may be or include an output device configured to receive data and provide an audible, visual, and/or tactile output in response to the data. In general, an output device may include one or more input interfaces configured to receive user input, and the output device may be configured to transmit data through the communication network 106 based on such user input. Examples of output devices include tablets, smartphones, laptop computers, other mobile computing devices, desktop computers, smart televisions, and the like.

Another example of the output system 110 may take the form of a work-order system configured to output a request for a mechanic or the like to repair an asset. Yet another example of the output system 110 may take the form of a parts-ordering system configured to place an order for a part of an asset and output a receipt thereof. Numerous other output systems are also possible.

The data source 112 may be configured to communicate with the analytics platform 108. In general, the data source 112 may be or include one or more computing systems configured to collect, store, and/or provide to other systems, such as the analytics platform 108, data that may be relevant to the functions performed by the analytics platform 108. The data source 112 may be configured to generate and/or obtain data independently from the assets 102 and 104. As such, the data provided by the data source 112 may be referred to herein as "external data." The data source 112 may be configured to provide current and/or historical data. In practice, the analytics platform 108 may receive data from the data source 112 by "subscribing" to a service provided by the data source. However, the analytics platform 108 may receive data from the data source 112 in other manners as well.

Examples of the data source 112 include environment data sources, asset-management data sources, and other data sources. In general, environment data sources provide data indicating some characteristic of the environment in which assets are operated. Examples of environment data sources include weather-data servers, global navigation satellite systems (GNSS) servers, map-data servers, and topography-data servers that provide information regarding natural and artificial features of a given area, among other examples.

In general, asset-management data sources provide data indicating events or statuses of entities (e.g., other assets) that may affect the operation or maintenance of assets (e.g., when and where an asset may operate or receive maintenance). Examples of asset-management data sources include traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, part-supplier servers that provide information regarding parts that particular suppliers have in stock and prices thereof, and repair-shop servers that provide information regarding repair shop capacity and the like, among other examples.

Examples of other data sources include power-grid servers that provide information regarding electricity consumption and external databases that store historical operating data for assets, among other examples. One of ordinary skill in the art will appreciate that these are but a few examples of data sources and that numerous others are possible.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. Example Asset

Figure 2:
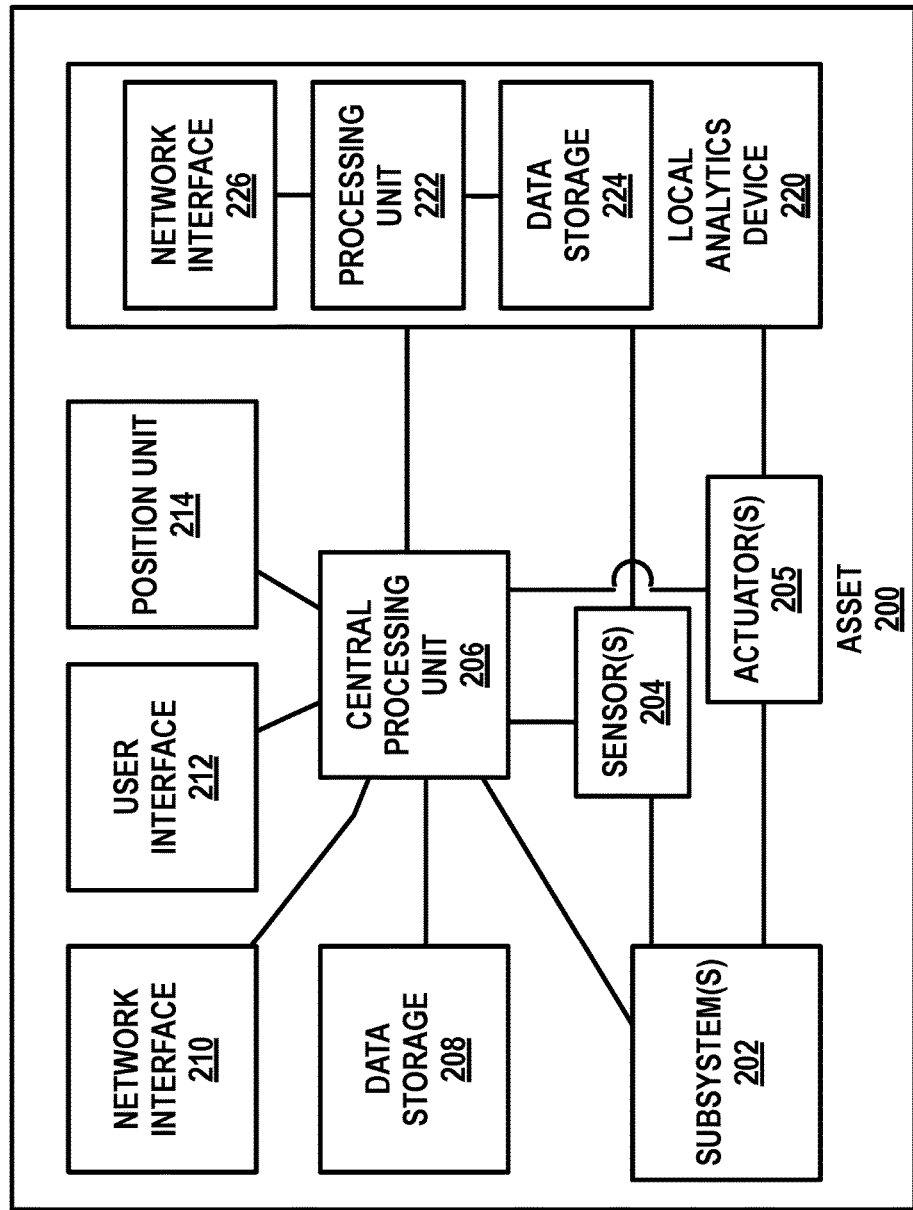
FIG. 2 depicts a simplified block diagram of an example asset.

Turning to FIG. 2, a simplified block diagram of an example asset 200 is depicted. Either or both of assets 102 and 104 from FIG. 1 may be configured like the asset 200. As shown, the asset 200 may include one or more subsystems 202, one or more sensors 204, one or more actuators 205, a central processing unit 206, data storage 208, a network interface 210, a user interface 212, a position unit 214, and perhaps also a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, and/or electromechanical components configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems.

For instance, in the context of transportation assets, examples of subsystems 202 may include engines, transmissions, drivetrains, fuel systems, battery systems, exhaust systems, braking systems, electrical systems, signal processing systems, generators, gear boxes, rotors, and hydraulic systems, among numerous other subsystems.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal, of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit 206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like. In example embodiments, one or more such sensors may be integrated with or located separate from the position unit 214, discussed below.

Additionally, various sensors 204 may be configured to measure other operating conditions of the asset 200, examples of which may include temperatures, pressures, speeds, acceleration or deceleration rates, friction, power usages, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Generally, the central processing unit 206 may include one or more processors and/or controllers, which may take the form of a general- or special-purpose processor or controller. In particular, in example implementations, the central processing unit 206 may be or include microprocessors, microcontrollers, application specific integrated circuits, digital signal processors, and the like. In turn, the data storage 208 may be or include one or more non-transitory computer-readable storage media, such as optical, magnetic, organic, or flash memory, among other examples.

The central processing unit 206 may be configured to store, access, and execute computer-readable program instructions stored in the data storage 208 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data in and later access it from the data storage 208.

The central processing unit 206 may also be configured to determine whether received sensor and/or actuator signals trigger any abnormal-condition indicators, such as fault codes. For instance, the central processing unit 206 may be configured to store in the data storage 208 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as the analytics platform 108.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to the analytics platform 108 and/or cause the asset's user interface 212 to output an indication of the abnormal condition, such as a visual and/or audible alert. Additionally, the central processing unit 206 may log the occurrence of the abnormal-condition indicator being triggered in the data storage 208, perhaps with a timestamp.

Figure 3:
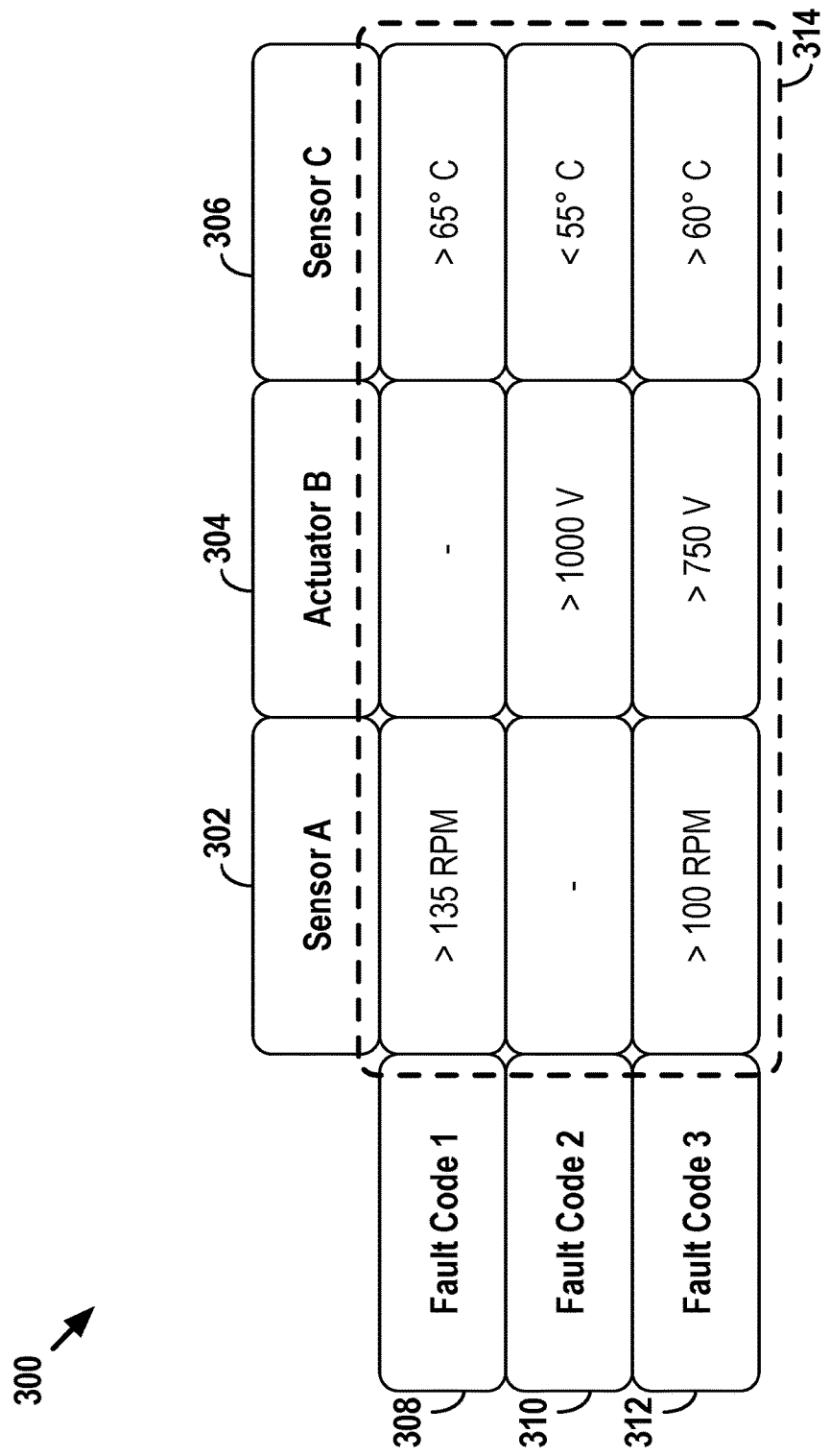
FIG. 3 depicts a conceptual illustration of example abnormal-condition indicators and triggering criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify sensor criteria (e.g., sensor value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, the user interfaces 212, and/or the position unit 214 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 208. Other functionalities of the central processing unit 206 are discussed below.

The network interface 210 may be configured to provide for communication between the asset 200 and various network components connected to the communication network 106. For example, the network interface 210 may be configured to facilitate wireless communications to and from the communication network 106 and may thus take the form of an antenna structure and associated equipment for transmitting and receiving various over-the-air signals. Other examples are possible as well. In practice, the network interface 210 may be configured according to a communication protocol, such as but not limited to any of those described above.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The position unit 214 may be generally configured to facilitate performing functions related to geo-spatial location/position and/or navigation. More specifically, the position unit 214 may be configured to facilitate determining the location/position of the asset 200 and/or tracking the asset 200's movements via one or more positioning technologies, such as a GNSS technology (e.g., GPS, GLONASS, Galileo, BeiDou, or the like), triangulation technology, and the like. As such, the position unit 214 may include one or more sensors and/or receivers that are configured according to one or more particular positioning technologies.

In example embodiments, the position unit 214 may allow the asset 200 to provide to other systems and/or devices (e.g., the analytics platform 108) position data that indicates the position of the asset 200, which may take the form of GPS coordinates, among other forms. In some implementations, the asset 200 may provide to other systems position data continuously, periodically, based on triggers, or in some other manner. Moreover, the asset 200 may provide position data independent of or along with other asset-related data (e.g., along with operating data).

The local analytics device 220 may generally be configured to receive and analyze data related to the asset 200 and based on such analysis, may cause one or more operations to occur at the asset 200. For instance, the local analytics device 220 may receive operating data for the asset 200 (e.g., data generated by the sensors 204 and/or actuators 205) and based on such data, may provide instructions to the central processing unit 206, the sensors 204, and/or the actuators 205 that cause the asset 200 to perform an operation. In another example, the local analytics device 220 may receive location data from the position unit 214 and based on such data, may modify how it handles predictive models and/or workflows for the asset 200. Other example analyses and corresponding operations are also possible.

To facilitate some of these operations, the local analytics device 220 may include one or more asset interfaces that are configured to couple the local analytics device 220 to one or more of the asset's on-board systems. For instance, as shown in FIG. 2, the local analytics device 220 may have an interface to the asset's central processing unit 206, which may enable the local analytics device 220 to receive data from the central processing unit 206 (e.g., operating data that is generated by sensors 204 and/or actuators 205 and sent to the central processing unit 206, or position data generated by the position unit 214) and then provide instructions to the central processing unit 206. In this way, the local analytics device 220 may indirectly interface with and receive data from other on-board systems of the asset 200 (e.g., the sensors 204 and/or actuators 205) via the central processing unit 206. Additionally or alternatively, as shown in FIG. 2, the local analytics device 220 could have an interface to one or more sensors 204 and/or actuators 205, which may enable the local analytics device 220 to communicate directly with the sensors 204 and/or actuators 205. The local analytics device 220 may interface with the on-board systems of the asset 200 in other manners as well, including the possibility that the interfaces illustrated in FIG. 2 are facilitated by one or more intermediary systems that are not shown.

In practice, the local analytics device 220 may enable the asset 200 to locally perform advanced analytics and associated operations, such as executing a predictive model and corresponding workflow, that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related to a predictive model. For example, the local analytics device 220 may receive data from a remote source, such as the analytics platform 108 or the output system 110, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective sensor and/or actuator signals generated by the sensors 204 and/or actuators 205 and may execute a predictive model and corresponding workflow based on such signals. Other functions are described below.

The network interface 226 may be the same or similar to the network interfaces described above. In practice, the network interface 226 may facilitate communication between the local analytics device 220 and the analytics platform 108.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces, it should also be understood that this might not always be the case. For example, in some implementations, the local analytics device 220 may not be physically coupled to its associated asset and instead may be located remote from the asset 200. In an example of such an implementation, the local analytics device 220 may be wirelessly, communicatively coupled to the asset 200. Other arrangements and configurations are also possible.

One of ordinary skill in the art will appreciate that the asset 200 shown in FIG. 2 is but one example of a simplified representation of an asset and that numerous others are also possible. For instance, other assets may include additional components not pictured and/or more or less of the pictured components. Moreover, a given asset may include multiple, individual assets that are operated in concert to perform operations of the given asset. Other examples are also possible.

III. Example Analytics Platform

Figure 4:
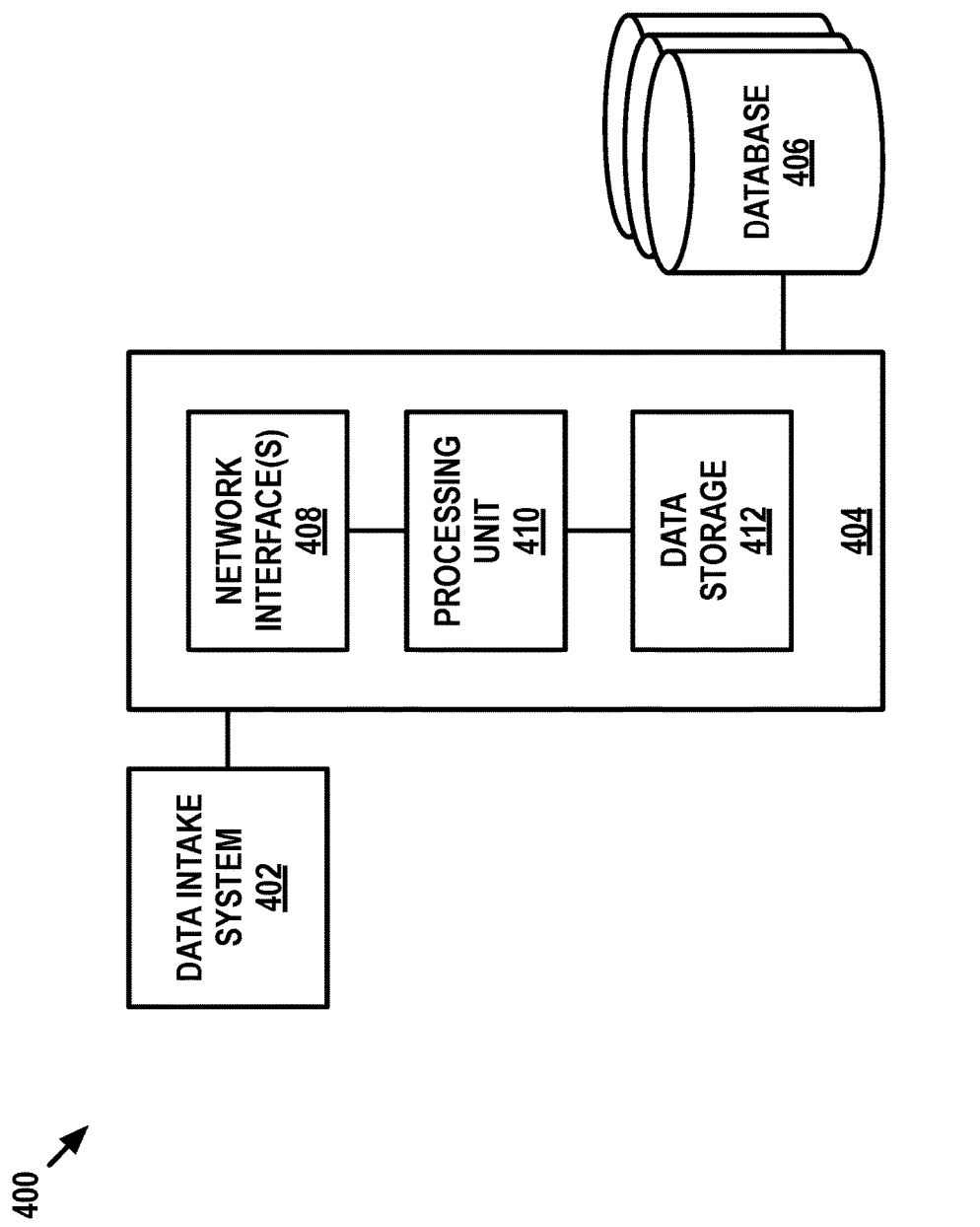
FIG. 4 depicts a simplified block diagram of an example analytics platform.

Referring now to FIG. 4, a simplified block diagram of an example analytics platform 400 is depicted. As suggested above, the analytics platform 400 may include one or more computing systems communicatively linked and arranged to carry out various operations described herein. For instance, as shown, the analytics platform 400 may include a data intake system 402, a data analysis system 404, and one or more databases 406. These system components may be communicatively coupled via one or more wireless and/or wired connections, which may be configured to facilitate secure communications. Further, two or more of these components may be integrated together in whole or in part.

The data intake system 402 may generally function to receive data and then ingest at least a portion of the received data for output to the data analysis system 404. As such, the data intake system 402 may include one or more network interfaces configured to receive data from various network components of the network configuration 100, such as the assets 102 and 104, the output system 110, and/or the data source 112. Specifically, the data intake system 402 may be configured to receive analog signals, data streams, and/or network packets, among other examples. As such, the network interfaces may include one or more wired network interfaces, such as a port or the like, and/or wireless network interfaces, similar to those described above. In some examples, the data intake system 402 may be or include components configured according to a given dataflow technology, such as a NiFi receiver or the like.

The data intake system 402 may include one or more processing components configured to perform one or more operations. Example operations may include compression and/or decompression, encryption and/or de-encryption, analog-to-digital and/or digital-to-analog conversion, amplification, formatting, and packaging, among other operations. Moreover, the data intake system 402 may be configured to filter, parse, sort, organize, route, and/or store data in accordance with one or more intake parameters. For example, the data intake system 402 may operate in accordance with an intake parameter that defines the particular set of data variables to intake from an asset (e.g., the particular set of asset sensor/actuator readings to be ingested). As another example, the data intake system 402 may operate in accordance with an intake parameter that defines a rate at which to intake data from an asset (e.g., a sampling frequency). As yet another example, the data intake system 402 may operate in accordance with an intake parameter that defines a storage location for data ingested from an asset. The data intake system 402 may operate in accordance with other intake parameters as well.

In general, the data received by the data intake system 402 may take various forms. For example, the payload of the data may include operating data such as a single sensor or actuator measurement, multiple sensor and/or actuator measurements, abnormal-condition data, and/or other data regarding the operation of an asset. Other examples are also possible.

Moreover, the received data may include other data corresponding to the operating data, such as a source identifier, a timestamp (e.g., a date and/or time at which the information was obtained), and/or location data. For instance, a unique identifier (e.g., a computer generated alphabetic, numeric, alphanumeric, or the like identifier) may be assigned to each asset, and perhaps to each sensor and actuator. Such identifiers may be operable to identify the asset, sensor, or actuator from which data originates. Further, the location data may represent the location of the asset (e.g., in the form of GPS coordinates or the like), and in certain cases, the location data may correspond to the location of the asset when certain information was obtained, such as operating data. In practice, the other data corresponding to the operating data may take the form of signal signatures or metadata, among other examples.

The data analysis system 404 may generally function to receive (e.g., from the data intake system 402) and analyze data and based on such analysis, cause one or more operations to occur. As such, the data analysis system 404 may include one or more network interfaces 408, a processing unit 410, and data storage 412, all of which may be communicatively linked by a system bus, network, or other connection mechanism. In some cases, the data analysis system 404 may be configured to store and/or access one or more application program interfaces (APIs) that facilitate carrying out some of the functionality disclosed herein.

The network interfaces 408 may be the same or similar to any network interface described above. In practice, the network interfaces 408 may facilitate communication (e.g., with some level of security) between the data analysis system 404 and various other entities, such as the data intake system 402, the databases 406, the assets 102, the output system 110, etc.

The processing unit 410 may include one or more processors, which may take any of the processor forms described above. In turn, the data storage 412 may be or include one or more non-transitory computer-readable storage media, which may take any of the forms of computer-readable storage media discussed above. The processing unit 410 may be configured to store, access, and execute computer-readable program instructions stored in the data storage 412 to perform the operations of an analytics platform described herein.

In general, the processing unit 410 may be configured to perform analytics on data received from the data intake system 402. To that end, the processing unit 410 may be configured to execute one or more modules, which may each take the form of one or more sets of program instructions that are stored in the data storage 412. The modules may be configured to facilitate causing an outcome to occur based on the execution of the respective program instructions. An example outcome from a given module may include outputting data into another module, updating the program instructions of the given module and/or of another module, and outputting data to a network interface 408 for transmission to an asset and/or the output system 110, among other examples.

The databases 406 may generally function to receive (e.g., from the data analysis system 404) and store data. As such, each database 406 may include one or more non-transitory computer-readable storage media, such as any of the examples provided above. In practice, the databases 406 may be separate from or integrated with the data storage 412.

The databases 406 may be configured to store numerous types of data, some of which is discussed below. In practice, some of the data stored in the databases 406 may include a timestamp indicating a date and time at which the data was generated or added to the database. Additionally or alternatively, some of the data stored in the databases 406 may include position data (e.g., GPS coordinates) indicating the position of an asset at a particular point in time and/or may also indicate the position of an asset when that asset generated or otherwise collected particular data.

Moreover, data may be stored in a number of manners in the databases 406. For instance, data may be stored in time sequence, in a tabular manner, and/or organized based on data source type (e.g., based on asset, asset type, sensor, sensor type, actuator, actuator type, or asset position) or abnormal-condition indicator, among other examples. Representative examples of database types may include time-series databases, document databases, relational databases, and graph databases, among others.

It should be understood that the analytics platform 400 may include other systems and/or components as well. For example, the analytics platform 400 could include a system that determines and/or tracks asset location. Other examples are possible as well.

IV. Example Operations

The operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

The following description may reference examples where a single data source, such as the asset 102, provides data to the analytics platform 108 that then performs one or more functions. It should be understood that this is done merely for sake of clarity and explanation and is not meant to be limiting. In practice, the analytics platform 108 generally receives data from multiple sources, perhaps simultaneously, and performs operations based on such aggregate received data.

A. Collection of Operating Data

As mentioned above, the representative asset 102 may take various forms and may be configured to perform a number of operations. In a non-limiting example, the asset 102 may take the form of a locomotive that is operable to transfer cargo across the United States. While in operation, the sensors and/or actuators of the asset 102 may obtain data that reflects one or more operating conditions of the asset 102. The sensors and/or actuators may transmit the data to a processing unit of the asset 102.

The processing unit may be configured to receive the data from the sensors and/or actuators. In practice, the processing unit may receive sensor data from multiple sensors and/or actuator data from multiple actuators simultaneously or sequentially. As discussed above, while receiving this data, the processing unit may also be configured to determine whether the data satisfies triggering criteria that trigger any abnormal-condition indicators, such as fault codes. In the event the processing unit determines that one or more abnormal-condition indicators are triggered, the processing unit may be configured to perform one or more local operations, such as outputting an indication of the triggered indicator via a user interface.

The asset 102 may then transmit operating data to the analytics platform 108 via a network interface of the asset 102 and the communication network 106. In example embodiments, as suggested above, the asset 102 may also provide other data along with the operating data. For instance, the asset 102 may provide location data, timestamps, and/or source identifiers corresponding to the operating data. Alternatively, the asset 102 may provide such other data in a different data stream than that for the operating data. For instance, the asset 102 may provide a first data stream that includes operating data for the asset, and the asset 102 may provide a second data stream that includes position data for the asset. Other examples are also possible.

In operation, the asset 102 may transmit operating data to the analytics platform 108 continuously, periodically, and/or in response to triggering events (e.g., abnormal conditions). Specifically, the asset 102 may transmit operating data periodically based on a particular frequency (e.g., daily, hourly, every fifteen minutes, once per minute, once per second, etc.), or the asset 102 may be configured to transmit a continuous, real-time feed of operating data. Additionally or alternatively, the asset 102 may be configured to transmit operating data based on certain triggers, such as when sensor and/or actuator measurements satisfy triggering criteria for any abnormal-condition indicators. The asset 102 may transmit operating data in other manners as well.

In practice, operating data for the asset 102 may include sensor data, actuator data, abnormal-condition data, and/or other asset event data (e.g., data indicating asset shutdowns, restarts, etc.). In some implementations, the asset 102 may be configured to provide the operating data in a single data stream, while in other implementations the asset 102 may be configured to provide the operating data in multiple, distinct data streams. For example, the asset 102 may provide to the analytics platform 108 a first data stream of sensor and/or actuator data and a second data stream of abnormal-condition data. As another example, the asset 102 may provide to the analytics platform 108 a separate data stream for each respective sensor and/or actuator on the asset 102. Other possibilities also exist.

Sensor and actuator data may take various forms. For example, at times, sensor data (or actuator data) may include measurements obtained by each of the sensors (or actuators) of the asset 102. While at other times, sensor data (or actuator data) may include measurements obtained by a subset of the sensors (or actuators) of the asset 102.

Specifically, the sensor and/or actuator data may include measurements obtained by the sensors and/or actuators associated with a given triggered abnormal-condition indicator. For example, if a triggered fault code is Fault Code 1 from FIG. 3, then sensor data may include raw measurements obtained by Sensors A and C. Additionally or alternatively, the data may include measurements obtained by one or more sensors or actuators not directly associated with the triggered fault code. Continuing off the last example, the data may additionally include measurements obtained by Actuator B and/or other sensors or actuators. In some examples, the asset 102 may include particular sensor data in the operating data based on a fault-code rule or instruction provided by the analytics platform 108, which may have, for example, determined that there is a correlation between that which Actuator B is measuring and that which caused the Fault Code 1 to be triggered in the first place. Other examples are also possible.

Further still, the data may include one or more sensor and/or actuator measurements from each sensor and/or actuator of interest based on a particular time of interest, which may be selected based on a number of factors. In some examples, the particular time of interest may be based on a sampling rate. In other examples, the particular time of interest may be based on the time at which an abnormal-condition indicator is triggered.

In particular, based on the time at which an abnormal-condition indicator is triggered, the data may include one or more respective sensor and/or actuator measurements from each sensor and/or actuator of interest (e.g., sensors and/or actuators directly and indirectly associated with the triggered indicator). The one or more measurements may be based on a particular number of measurements or particular duration of time around the time of the triggered abnormal-condition indicator.

For example, if a triggered fault code is Fault Code 2 from FIG. 3, the sensors and actuators of interest might include Actuator B and Sensor C. The one or more measurements may include the most recent respective measurements obtained by Actuator B and Sensor C prior to the triggering of the fault code (e.g., triggering measurements) or a respective set of measurements before, after, or about the triggering measurements. For example, a set of five measurements may include the five measurements before or after the triggering measurement (e.g., excluding the triggering measurement), the four measurements before or after the triggering measurement and the triggering measurement, or the two measurements before and the two after as well as the triggering measurement, among other possibilities.

Similar to sensor and actuator data, the abnormal-condition data may take various forms. In general, the abnormal-condition data may include or take the form of an indicator that is operable to uniquely identify a particular abnormal condition that occurred at the asset 102 from all other abnormal conditions that may occur at the asset 102. The abnormal-condition indicator may take the form of an alphabetic, numeric, or alphanumeric identifier, among other examples. Moreover, the abnormal-condition indicator may take the form of a string of words that is descriptive of the abnormal condition, such as "Overheated Engine" or "Out of Fuel", among other examples.

The analytics platform 108, and in particular, the data intake system of the analytics platform 108, may then be configured to receive data from one or more assets, such as operating data and/or position data, and/or from other data sources. The data intake system may be configured to intake at least a portion of the received data, perform one or more operations to the received data, and then relay the data to the data analysis system of the analytics platform 108.

B. Uses of Operating Data

During standard operation, the operating data collected for a given asset may then be used for various purposes. As one example, the operating data may be used during the process of defining, modifying, and/or executing predictive models and corresponding workflows (i.e., "model-workflow pairs") related to asset operation. As another example, the operating data may be used during the process of defining, modifying, and/or executing other workflows (e.g., workflows that are independent of a predictive model) related to asset operation, such as a workflow for providing notifications based on an asset's operating data. Other examples are possible as well. These example uses of an asset's operating data will now be described in further detail below.

1. Model-Workflow Pairs

As one example, the analytics platform 108 may use operating data for a plurality of assets (among other data) to define, modify, and/or execute model-workflow pairs related to asset operation.

In general, a model-workflow pair may include a set of program instructions that cause a device to monitor certain operating conditions of an asset in order to determine the likelihood that at least one event of a given group of events will occur in the future and then carry out certain operations if this likelihood meets certain conditions. For instance, a predictive model may include one or more algorithms whose inputs are sensor and/or actuator data from one or more sensors and/or actuators of an asset and whose outputs are utilized to determine a probability that a particular type of event may occur (or that no such event may occur) at the asset within a particular period of time in the future. In turn, a corresponding workflow may take the form of one or more operations that are performed if the predictive model's output meets certain conditions.

In practice, the analytics platform 108 may be configured to define aggregate and/or individualized predictive models and/or workflows. An "aggregate" model-workflow pair may refer to a model-workflow pair that is generic for a group of assets and defined without taking into consideration individual characteristics of a given asset (or assets). On the other hand, an "individualized" model/workflow may refer to a model-workflow pair that is specifically tailored for a single asset or a subgroup of assets from the group of assets and defined based on particular characteristics of the single asset or subgroup of assets.

The process of defining and executing the model-workflow pairs will now be described in further detail below.

a. Defining Predictive Models

In example implementations, the analytics platform 108 may be configured to define an aggregate model-workflow pair based on aggregated operating data for a plurality of assets. Defining aggregate model-workflow pairs may be performed in a variety of manners.

Figure 5:
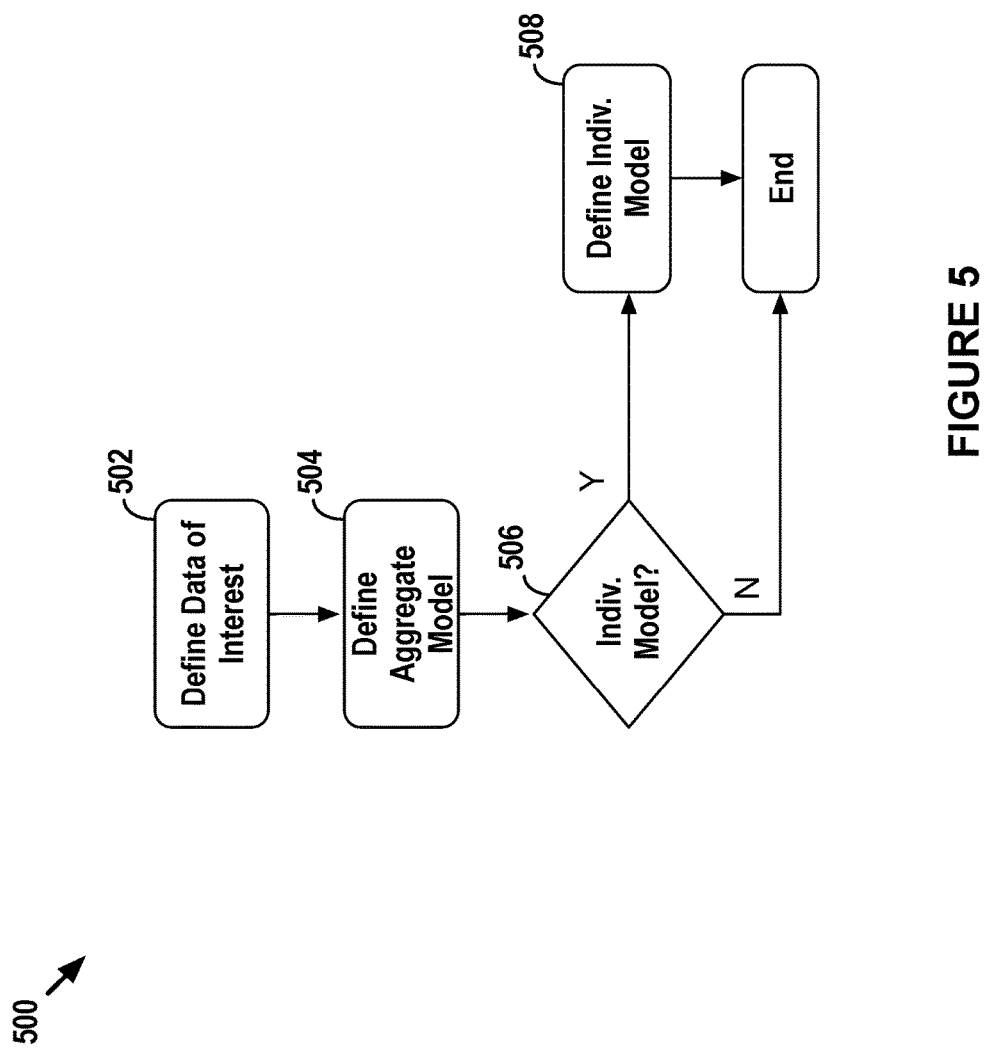
FIG. 5 depicts an example flow diagram of a definition phase that may be used for defining a predictive model.

FIG. 5 is a flow diagram 500 depicting one possible example of a definition phase that may be used for defining a predictive model. For purposes of illustration, the example definition phase is described as being carried out by the analytics platform 108, but this definition phase may be carried out by other systems as well. One of ordinary skill in the art will appreciate that the flow diagram 500 is provided for sake of clarity and explanation and that numerous other combinations of operations may be utilized to define a model-workflow pair.

As shown in FIG. 5, at block 502, the analytics platform 108 may begin by defining a set of data that forms the basis for a given predictive model (e.g., the data of interest). The data of interest may derive from a number of sources, such as the assets 102 and 104 and the data source 112, and may be stored in a database of the analytics platform 108.

The data of interest may include historical data for a particular set of assets from a group of assets or all of the assets from a group of assets (e.g., the assets of interest). Moreover, the data of interest may include measurements from a particular set of sensors and/or actuators from each of the assets of interest or from all of the sensors and/or actuators from each of the assets of interest. Further still, the data of interest may include data from a particular period of time in the past, such as two week's worth of historical data.

The data of interest may include a variety of types of data, which may depend on the given predictive model. In some instances, the data of interest may include at least operating data indicating operating conditions of assets, where the operating data is as discussed above in the Collection of Operating Data section. Additionally, the data of interest may include environment data indicating environments in which assets are typically operated and/or scheduling data indicating planned dates and times during which assets are to carry out certain tasks. Other types of data may also be included in the data of interest.

In practice, the data of interest may be defined in a number of manners. In one example, the data of interest may be user-defined. In particular, a user may operate an output system 110 that receives user inputs indicating a selection of certain data of interest, and the output system 110 may provide to the analytics platform 108 data indicating such selections. Based on the received data, the analytics platform 108 may then define the data of interest.

In another example, the data of interest may be machine-defined. In particular, the analytics platform 108 may perform various operations, such as simulations, to determine the data of interest that generates the most accurate predictive model. Other examples are also possible.

Returning to FIG. 5, at block 504, the analytics platform 108 may be configured to, based on the data of interest, define an aggregate, predictive model that is related to the operation of assets. In general, an aggregate, predictive model may define a relationship between operating conditions of assets and a likelihood of an event occurring at the asset. Specifically, an aggregate, predictive model may receive as inputs sensor data from sensors of an asset and/or actuator data from actuators of the asset and output a probability that at least one event of a given group of events will occur at the asset within a certain amount of time into the future.

The event that the predictive model predicts may vary depending on the particular implementation. For example, such an event may take the form of a failure event that may occur at an asset, in which case the predictive model may predict the likelihood that a failure event will occur within a certain period of time in the future. In another example, such an event may take the form of an action that may be taken by an asset (e.g., a restart or shutdown action), in which case the predictive model may predict the likelihood that an asset will take and/or complete the action within a certain period of time in the future. In other examples, such an event may take the form of a completed task (e.g., delivering a payload of goods to a destination), in which case the predictive model may predict the likelihood that an asset will complete the task within a certain period of time in the future. In yet another example, such an event may take the form of a replacement event (e.g., fluid or component replacement), in which case the predictive model may predict an amount of time before a replacement event needs to occur. In yet other examples, such an event may take the form of a change in asset productivity, in which case the predictive model may predict the productivity of an asset during a particular period of time in the future. In still another example, such an event may take the form of a "leading indicator" event indicating that an asset's behavior that differs from expected asset behaviors, in which case the predictive model may predict the likelihood of one or more leading indicator events occurring in the future. Other examples of predictive models are also possible.

In general, defining the aggregate, predictive model may involve utilizing one or more modeling techniques to generate a model that returns a probability between zero and one, such as a random forest technique, logistic regression technique, or other regression technique, among other modeling techniques. However, other techniques are possible as well.

In one particular example implementation, the predictive model may take the form of one or more predictive models for monitoring the health and outputting a health metric (e.g., "health score") for an asset, which is a single, aggregated metric that indicates whether a failure will occur at a given asset within a given timeframe into the future (e.g., the next two weeks). In particular, a health metric may indicate a likelihood that no failures from a group of failures will occur at an asset within a given timeframe into the future, or a health metric may indicate a likelihood that at least one failure from a group of failures will occur at an asset within a given timeframe into the future.

Depending on the desired granularity of the health metric, the analytics platform 108 may be configured to define different predictive models that output different levels of health metrics, each of which may be used as the predictive model in accordance with the present disclosure. For example, the analytics platform 108 may define a predictive model that outputs a health metric for the asset as a whole (i.e., an asset-level health metric). As another example, the analytics platform 108 may define a respective predictive model that outputs a respective health metric for one or more subsystems of the asset (i.e., subsystem-level health metrics). In some cases, the outputs of each subsystem-level predictive model may be combined to generate an asset-level health metric. Other examples are also possible.

Figure 6:
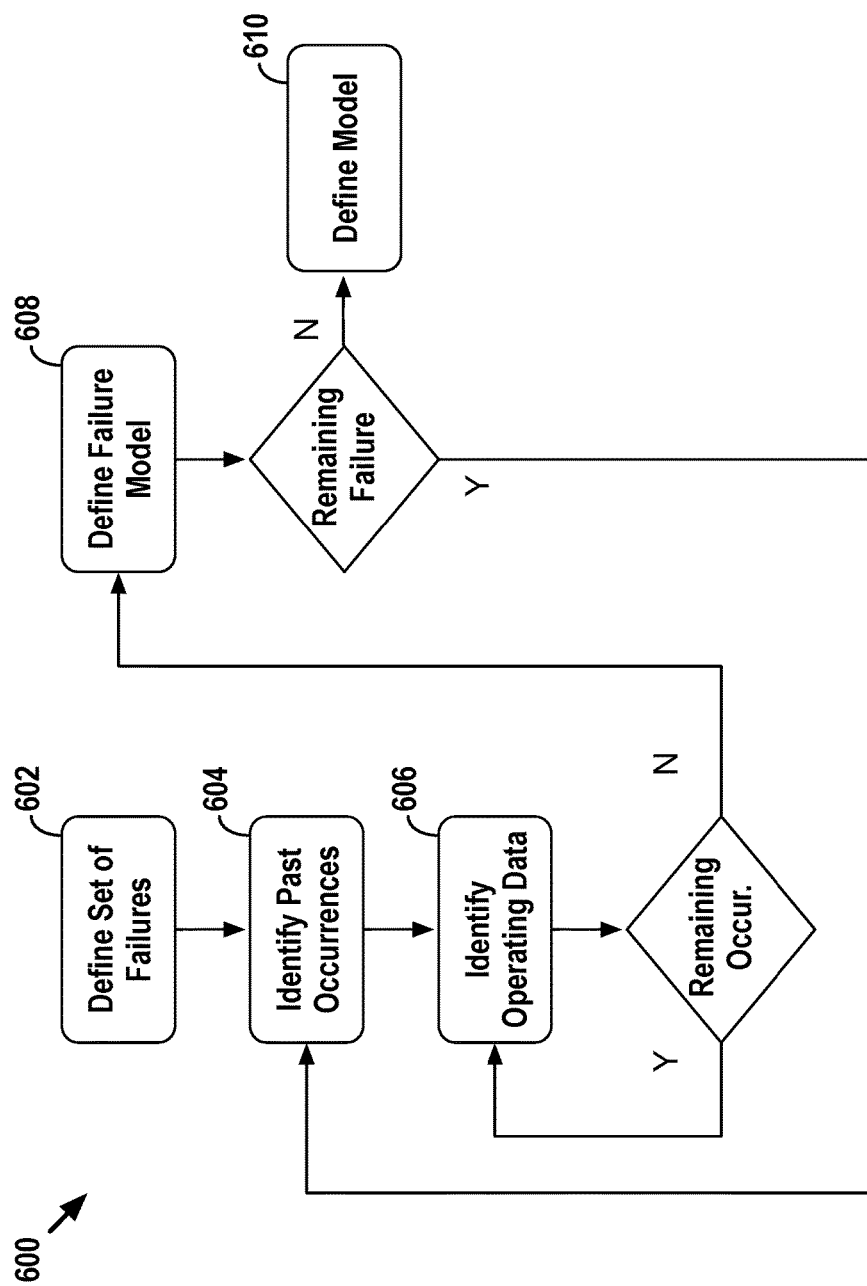
FIG. 6 depicts an example flow diagram of a modeling phase that may be used for defining a predictive model that outputs a health metric.

In general, defining a predictive model that outputs a health metric may be performed in a variety of manners. FIG. 6 is a flow diagram 600 depicting one possible example of a modeling phase that may be used for defining a model that outputs a health metric. For purposes of illustration, the example modeling phase is described as being carried out by the analytics platform 108, but this modeling phase may be carried out by other systems as well. One of ordinary skill in the art will appreciate that the flow diagram 600 is provided for sake of clarity and explanation and that numerous other combinations of operations may be utilized to determine a health metric.

As shown in FIG. 6, at block 602, the analytics platform 108 may begin by defining a set of the one or more failures that form the basis for the health metric (i.e., the failures of interest). In practice, the one or more failures may be those failures that could render an asset (or a subsystem thereof) inoperable if they were to occur. Based on the defined set of failures, the analytics platform 108 may take steps to define a model for predicting a likelihood of any of the failures occurring within a given timeframe in the future (e.g., the next two weeks).

In particular, at block 604, the analytics platform 108 may analyze historical operating data for a group of one or more assets to identify past occurrences of a given failure from the set of failures. At block 606, the analytics platform 108 may identify a respective set of operating data that is associated with each identified past occurrence of the given failure (e.g., sensor and/or actuator data from a given timeframe prior to the occurrence of the given failure). At block 608, the analytics platform 108 may analyze the identified sets of operating data associated with past occurrences of the given failure to define a relationship (e.g., a failure model) between (1) the values for a given set of operating metrics and (2) the likelihood of the given failure occurring within a given timeframe in the future (e.g., the next two weeks). Lastly, at block 610, the defined relationship for each failure in the defined set (e.g., the individual failure models) may then be combined into a model for predicting the overall likelihood of a failure occurring.

As the analytics platform 108 continues to receive updated operating data for the group of one or more assets, the analytics platform 108 may also continue to refine (e.g., modify) the predictive model for the defined set of one or more failures by repeating steps 604-610 on the updated operating data.

The functions of the example modeling phase illustrated in FIG. 6 will now be described in further detail. Starting with block 602, as noted above, the analytics platform 108 may begin by defining a set of the one or more failures that form the basis for the health metric. The analytics platform 108 may perform this function in various manners.

In one example, the set of the one or more failures may be based on one or more user inputs. Specifically, the analytics platform 108 may receive from a computing system operated by a user, such as the output system 110, input data indicating a user selection of the one or more failures. As such, the set of one or more failures may be user-defined.

In other examples, the set of the one or more failures may be based on a determination made by the analytics platform 108 (e.g., machine-defined). In particular, the analytics platform 108 may be configured to define the set of one or more failures, which may occur in a number of manners.

For instance, the analytics platform 108 may be configured to define the set of failures based on one or more characteristics of the asset 102. That is, certain failures may correspond to certain characteristics, such as asset type, class, etc., of an asset. For example, each type and/or class of asset may have respective failures of interest.

In another instance, the analytics platform 108 may be configured to define the set of failures based on historical data stored in the databases of the analytics platform 108 and/or external data provided by the data source 112. For example, the analytics platform 108 may utilize such data to determine which failures result in the longest repair-time and/or which failures are historically followed by additional failures, among other examples.

In yet other examples, the set of one or more failures may be defined based on a combination of user inputs and determinations made by the analytics platform 108. Other examples are also possible.

At block 604, for each of the failures from the set of failures, the analytics platform 108 may analyze historical operating data for a group of one or more assets (e.g., abnormal-condition data) to identify past occurrences of a given failure. The group of the one or more assets may include a single asset, such as asset 102, or multiple assets of a same or similar type, such as fleet of assets that includes the assets 102 and 104. The analytics platform 108 may analyze a particular amount of historical operating data, such as a certain amount of time's worth of data (e.g., a month's worth) or a certain number of data-points (e.g., the most recent thousand data-points), among other examples.

In practice, identifying past occurrences of the given failure may involve the analytics platform 108 identifying the type of operating data, such as abnormal-condition data, that indicates the given failure. In general, a given failure may be associated with one or multiple abnormal-condition indicators, such as fault codes. That is, when the given failure occurs, one or multiple abnormal-condition indicators may be triggered. As such, abnormal-condition indicators may be reflective of an underlying symptom of a given failure.

After identifying the type of operating data that indicates the given failure, the analytics platform 108 may identify the past occurrences of the given failure in a number of manners. For instance, the analytics platform 108 may locate, from historical operating data stored in the databases of the analytics platform 108, abnormal-condition data corresponding to the abnormal-condition indicators associated with the given failure. Each located abnormal-condition data would indicate an occurrence of the given failure. Based on this located abnormal-condition data, the analytics platform 108 may identify a time at which a past failure occurred.

At block 606, the analytics platform 108 may identify a respective set of operating data that is associated with each identified past occurrence of the given failure. In particular, the analytics platform 108 may identify a set of sensor and/or actuator data from a certain timeframe around the time of the given occurrence of the given failure. For example, the set of data may be from a particular timeframe (e.g., two weeks) before, after, or around the given occurrence of the failure. In other cases, the set of data may be identified from a certain number of data-points before, after, or around the given occurrence of the failure.

In example implementations, the set of operating data may include sensor and/or actuator data from some or all of the sensors and actuators of the asset 102. For example, the set of operating data may include data from sensors and/or actuators associated with an abnormal-condition indicator corresponding to the given failure.

Figure 7:
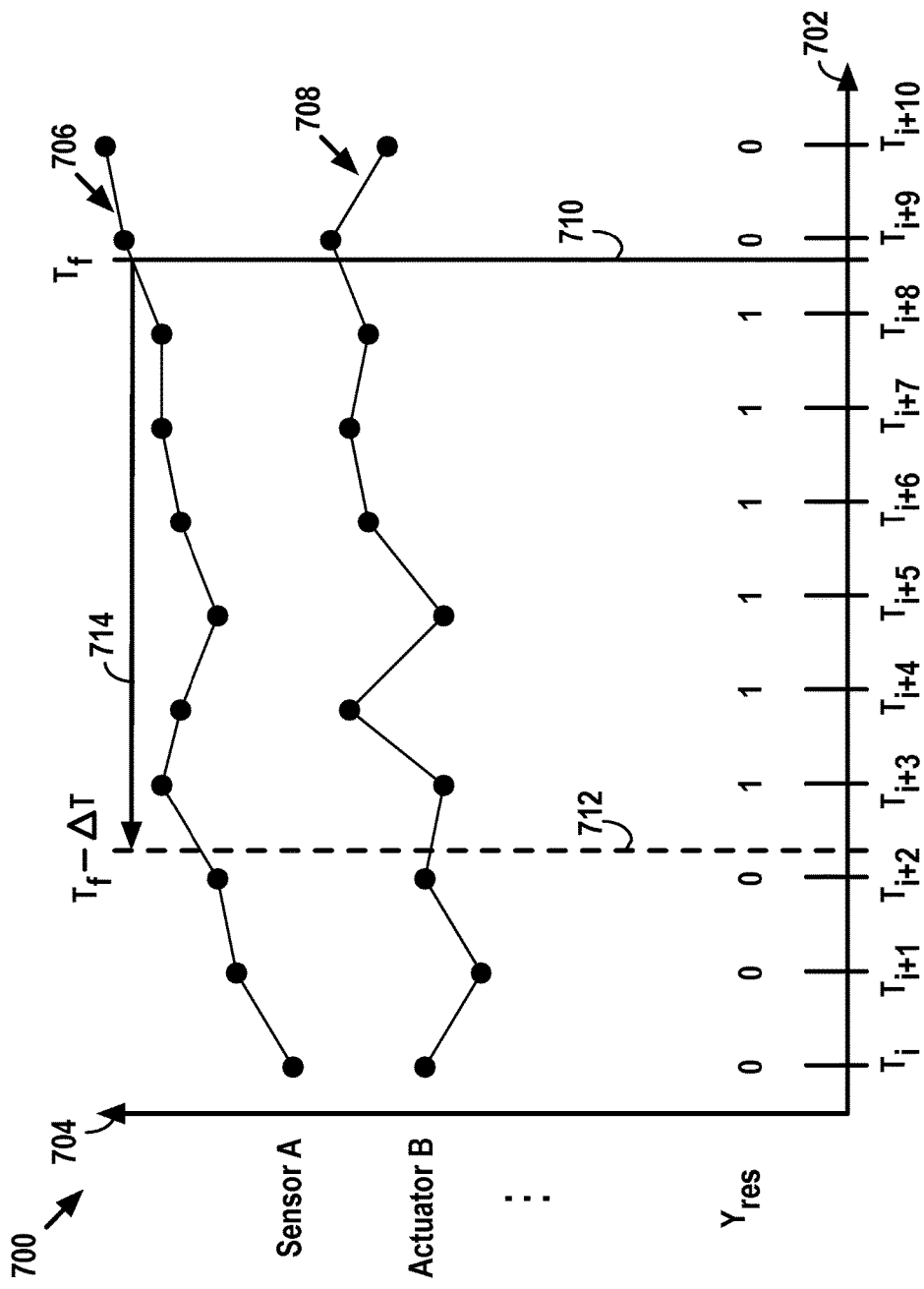
FIG. 7 depicts a conceptual illustration of data utilized to define a model.

To illustrate, FIG. 7 depicts a conceptual illustration of historical operating data that the analytics platform 108 may analyze to facilitate defining a model. Plot 700 may correspond to a segment of historical data that originated from some (e.g., Sensor A and Actuator B) or all of the sensors and actuators of the asset 102. As shown, the plot 700 includes time on the x-axis 702, measurement values on the y-axis 704, and sensor data 706 corresponding to Sensor A and actuator data 708 corresponding to Actuator B, each of which includes various data-points representing measurements at particular points in time, $T_i$. Moreover, the plot 700 includes an indication of an occurrence of a failure 710 that occurred at a past time, $T_f$ (e.g., "time of failure"), and an indication of an amount of time 712 before the occurrence of the failure, $\Delta T$, from which sets of operating data are identified. As such, $T_f$–$\Delta T$ defines a timeframe 714 of data-points of interest.

Returning to FIG. 6, after the analytics platform 108 identifies the set of operating data for the given occurrence of the given failure (e.g., the occurrence at $T_f$), the analytics platform 108 may determine whether there are any remaining occurrences for which a set of operating data should be identified. In the event that there is a remaining occurrence, block 606 would be repeated for each remaining occurrence.

Thereafter, at block 608, the analytics platform 108 may analyze the identified sets of operating data associated with the past occurrences of the given failure to define a relationship (e.g., a failure model) between (1) a given set of operating metrics (e.g., a given set of sensor and/or actuator measurements) and (2) the likelihood of the given failure occurring within a given timeframe in the future (e.g., the next two weeks). That is, a given failure model may take as inputs sensor and/or actuator measurements from one or more sensors and/or actuators and output a probability that the given failure will occur within the given timeframe in the future.

In general, a failure model may define a relationship between operating conditions of the asset 102 and the likelihood of a failure occurring. In some implementations, in addition to raw data signals from sensors and/or actuators of the asset 102, a failure model may receive a number of other data inputs, also known as features, which are derived from the sensor and/or actuator signals. Such features may include an average or range of values that were historically measured when a failure occurred, an average or range of value gradients (e.g., a rate of change in measurements) that were historically measured prior to an occurrence of a failure, a duration of time between failures (e.g., an amount of time or number of data-points between a first occurrence of a failure and a second occurrence of a failure), and/or one or more failure patterns indicating sensor and/or actuator measurement trends around the occurrence of a failure. One of ordinary skill in the art will appreciate that these are but a few example features that can be derived from sensor and/or actuator signals and that numerous other features are possible.

In practice, a failure model may be defined in a number of manners. In example implementations, the analytics platform 108 may define a failure model by utilizing one or more modeling techniques that return a probability between zero and one, which may take the form of any modeling techniques described above.

In a particular example, defining a failure model may involve the analytics platform 108 generating a response variable based on the historical operating data identified at block 606. Specifically, the analytics platform 108 may determine an associated response variable for each set of sensor and/or actuator measurements received at a particular point in time. As such, the response variable may take the form of a data set associated with the failure model.

The response variable may indicate whether the given set of measurements is within any of the timeframes determined at block 606. That is, a response variable may reflect whether a given set of data is from a time of interest about the occurrence of a failure. The response variable may be a binary-valued response variable such that, if the given set of measurements is within any of determined timeframes, the associated response variable is assigned a value of one, and otherwise, the associated response variable is assigned a value of zero.

Returning to FIG. 7, a conceptual illustration of a response variable vector, $Y_{res}$, is shown on the plot 700. As shown, response variables associated with sets of measurements that are within the timeframe 714 have a value of one (e.g., $Y_{res}$ at times $T_{i+3}$–$T_{i+8}$), while response variables associated with sets of measurements outside the timeframe 714 have a value of zero (e.g., $Y_{res}$ at times $T_i$–$T_{i+2}$ and $T_{i+9}$–$T_{i+10}$). Other response variables are also possible.

Continuing in the particular example of defining a failure model based on a response variable, the analytics platform 108 may train the failure model with the historical operating data identified at block 606 and the generated response variable. Based on this training process, the analytics platform 108 may then define the failure model that receives as inputs various sensor and/or actuator data and outputs a probability between zero and one that a failure will occur within a period of time equivalent to the timeframe used to generate the response variable.

In some cases, training with the historical operating data identified at block 606 and the generated response variable may result in variable importance statistics for each sensor and/or actuator. A given variable importance statistic may indicate the sensor's or actuator's relative effect on the probability that a given failure will occur within the period of time into the future.

Additionally or alternatively, the analytics platform 108 may be configured to define a failure model based on one or more survival analysis techniques, such as a Cox proportional hazard technique. The analytics platform 108 may utilize a survival analysis technique in a manner similar in some respects to the above-discussed modeling technique, but the analytics platform 108 may determine a survival time-response variable that indicates an amount of time from the last failure to a next expected event. A next expected event may be either reception of sensor and/or actuator measurements or an occurrence of a failure, whichever occurs first. This response variable may include a pair of values that are associated with each of the particular points in time at which measurements are received. The response variable may then be utilized to determine a probability that a failure will occur within the given timeframe in the future.

In some example implementations, the failure model may be defined based in part on external data, such as weather data, and "hotbox" data, among other data. For instance, based on such data, the failure model may increase or decrease an output failure probability.

In practice, external data may be observed at points in time that do not coincide with times at which asset sensors and/or actuators obtain measurements. For example, the times at which "hotbox" data is collected (e.g., times at which a locomotive passes along a section of railroad track that is outfitted with hot box sensors) may be in disagreement with sensor and/or actuator measurement times. In such cases, the analytics platform 108 may be configured to perform one or more operations to determine external data observations that would have been observed at times that correspond to the sensor measurement times.

Specifically, the analytics platform 108 may utilize the times of the external data observations and times of the measurements to interpolate the external data observations to produce external data values for times corresponding to the measurement times. Interpolation of the external data may allow external data observations or features derived therefrom to be included as inputs into the failure model. In practice, various techniques may be used to interpolate the external data with the sensor and/or actuator data, such as nearest-neighbor interpolation, linear interpolation, polynomial interpolation, and spline interpolation, among other examples.

Returning to FIG. 6, after the analytics platform 108 determines a failure model for a given failure from the set of failures defined at block 602, the analytics platform 108 may determine whether there are any remaining failures for which a failure model should be determined. In the event that there remains a failure for which a failure model should be determined, the analytics platform 108 may repeat the loop of blocks 604-608. In some implementations, the analytics platform 108 may determine a single failure model that encompasses all of the failures defined at block 602. In other implementations, the analytics platform 108 may determine a failure model for each subsystem of the asset 102, which may then be utilized to determine an asset-level failure model. Other examples are also possible.

Lastly, at block 610, the defined relationship for each failure in the defined set (e.g., the individual failure models) may then be combined into the model (e.g., the health-metric model) for predicting the overall likelihood of a failure occurring within the given timeframe in the future (e.g., the next two weeks). That is, the model receives as inputs sensor and/or actuator measurements from one or more sensors and/or actuators and outputs a single probability that at least one failure from the set of failures will occur within the given timeframe in the future.

The analytics platform 108 may define the health-metric model in a number of manners, which may depend on the desired granularity of the health metric. That is, in instances where there are multiple failure models, the outcomes of the failure models may be utilized in a number of manners to obtain the output of the health-metric model. For example, the analytics platform 108 may determine a maximum, median, or average from the multiple failure models and utilize that determined value as the output of the health-metric model.

In other examples, determining the health-metric model may involve the analytics platform 108 attributing a weight to individual probabilities output by the individual failure models. For instance, each failure from the set of failures may be considered equally undesirable, and so each probability may likewise be weighted the same in determining the health-metric model. In other instances, some failures may be considered more undesirable than others (e.g., more catastrophic or require longer repair time, etc.), and so those corresponding probabilities may be weighted more than others.

In yet other examples, determining the health-metric model may involve the analytics platform 108 utilizing one or more modeling techniques, such as a regression technique. An aggregate response variable may take the form of the logical disjunction (logical OR) of the response variables (e.g., $Y_{res}$ in FIG. 7) from each of the individual failure models. For example, aggregate response variables associated with any set of measurements that occur within any timeframe determined at block 606 (e.g., the timeframe 714 of FIG. 7) may have a value of one, while aggregate response variables associated with sets of measurements that occur outside any of the timeframes may have a value of zero. Other manners of defining the health-metric model are also possible.

In some implementations, block 610 may be unnecessary. For example, as discussed above, the analytics platform 108 may determine a single failure model, in which case the health-metric model may be the single failure model.

It should be understood, however, that the health score model disclosed herein is simply one example of a predictive model that may be used to trigger the workflow for adjusting intake operation. Other examples of predictive models may be used as well.

Returning back to FIG. 5, the analytics platform 108 may also be configured to define individualized predictive models for assets, which may involve utilizing the aggregate, predictive model as a baseline. The individualization may be based on certain characteristics of assets. In this way, the analytics platform 108 may provide a given asset a more accurate and robust predictive model compared to the aggregate predictive model.

In particular, at block 506, the analytics platform 108 may be configured to decide whether to individualize the aggregate model defined at block 504 for a given asset, such as the asset 102. The analytics platform 108 may carry out this decision in a number of manners.

In some cases, the analytics platform 108 may be configured to define individualized predictive models by default. In other cases, the analytics platform 108 may be configured to decide whether to define an individualized predictive model based on certain characteristics of the asset 102. For example, in some cases, only assets of certain types or classes, or operated in certain environments, or that have certain health scores may receive an individualized predictive model. In yet other cases, a user may define whether an individualized model is defined for the asset 102. Other examples are also possible.

In any event, if the analytics platform 108 decides to define an individualized predictive model for the asset 102, the analytics platform 108 may do so at block 508.

At block 508, the analytics platform 108 may be configured to define an individualized predictive model in a number of manners. In example implementations, the analytics platform 108 may define an individualized predictive model based at least in part on one or more characteristics of the asset 102.

Before defining the individualized predictive model for the asset 102, the analytics platform 108 may have determined one or more asset characteristics of interest that form the basis of individualized models. In practice, different predictive models may have different corresponding characteristics of interest.

In general, the characteristics of interest may be characteristics that are related to the aggregate model-workflow pair. For instance, the characteristics of interest may be characteristics that the analytics platform 108 has determined influence the accuracy of the aggregate model-workflow pair. Examples of such characteristics may include asset age, asset usage, asset capacity, asset load, asset health (perhaps indicated by an asset health metric, discussed below), asset class (e.g., brand and/or model), and environment in which an asset is operated, among other characteristics.

The analytics platform 108 may have determined the characteristics of interest in a number of manners. In one example, the analytics platform 108 may have done so by performing one or more modeling simulations that facilitate identifying the characteristics of interest. In another example, the characteristics of interest may have been predefined and stored in the data storage of the analytics platform 108. In yet another example, characteristics of interest may have been defined by a user and provided to the analytics platform 108 via the output system 110. Other examples are also possible.

In any event, after determining the characteristics of interest, the analytics platform 108 may determine characteristics of the asset 102 that correspond to the determined characteristics of interest. That is, the analytics platform 108 may determine a type, value, existence or lack thereof, etc. of the asset 102's characteristics that correspond to the characteristics of interest. The analytics platform 108 may perform this operation in a number of manners.

For examples, the analytics platform 108 may be configured to perform this operation based on data originating from the asset 102 and/or the data source 112. In particular, the analytics platform 108 may utilize operating data for the asset 102 and/or external data from the data source 112 to determine one or more characteristics of the asset 102. Other examples are also possible.

Based on the determined one or more characteristics of the asset 102, the analytics platform 108 may define an individualized, predictive model by modifying the aggregate model. The aggregate model may be modified in a number of manners. For example, the aggregate model may be modified by changing (e.g., adding, removing, re-ordering, etc.) one or more model inputs, changing one or more sensor and/or actuator measurement ranges that correspond to asset-operating limits (e.g., changing operating limits that correspond to "leading indicator" events), changing one or more model calculations, weighting (or changing a weight of) a variable or output of a calculation, utilizing a modeling technique that differs from that which was utilized to define the aggregate model, and/or utilizing a response variable that differs from that which was utilized to define the aggregate model, among other examples.

In practice, individualizing the aggregate model may depend on the one or more characteristics of the given asset. In particular, certain characteristics may affect the modification of the aggregate model differently than other characteristics. Further, the type, value, existence, or the like of a characteristic may affect the modification as well. For example, the asset age may affect a first part of the aggregate model, while an asset class may affect a second, different part of the aggregate model. And an asset age within a first range of ages may affect the first part of the aggregate model in a first manner, while an asset age within a second range of ages, different from the first range, may affect the first part of the aggregate model in a second, different manner. Other examples are also possible.

In some implementations, individualizing the aggregate model may depend on considerations in addition to or alternatively to asset characteristics. For instance, the aggregate model may be individualized based on sensor and/or actuator readings of an asset when the asset is known to be in a relatively good operating state (e.g., as defined by a mechanic or the like). More particularly, in an example of a leading-indicator predictive model, the analytics platform 108 may be configured to receive an indication that the asset is in a good operating state (e.g., from a computing device operated by a mechanic) along with operating data from the asset. Based at least on the operating data, the analytics platform 108 may then individualize the leading-indicator predictive model for the asset by modifying respective operating limits corresponding to "leading indicator" events. Other examples are also possible.

It should also be understood that, in some example implementations, the analytics platform 108 may be configured to define an individualized predictive model for a given asset without first defining an aggregate predictive model. Other examples are also possible.

Once a predictive model is defined, the analytics platform 108 may also be configured to update (e.g., modify) that model based on new asset data. For instance, based on new operating data received from assets or other data sources, the analytics platform 108 may modify an aggregate and/or individualized model for an asset. The analytics platform 108 could perform this updating function periodically (e.g., daily, weekly, monthly, etc.) and/or in response to some triggering event (e.g., the receipt of new historical data or the occurrence of an event). The analytics platform 108 may update the predictive model in other manners as well.

The analytics platform 108 may further be configured to transmit an aggregate and/or individualized predictive model to other devices and/or systems that then function to execute the predictive model. As one possible example, the analytics platform 108 may transmit an aggregate and/or individualized predictive model to any asset that is configured to locally execute the predictive model (e.g., via a local analytics device or the like). The analytics platform 108 may be configured to perform this transmission periodically or based on triggering events, such as any modifications or updates to a predictive model.

It should also be understood that devices and/or systems other than the analytics platform 108 may be configured to individualize and modify the predictive models. For example, if an asset includes a local analytics device that is configured to receive and execute a predictive model, then this local analytics device could also be configured to individualize and/or modify a predictive model either alone or in combination with the analytics platform 108. The operation of a representative local analytics device is disclosed in further detail in U.S. application Ser. No. 14/963,207, which is incorporated by reference herein in its entirety.

b. Defining Corresponding Workflows

As noted above, the predictive model disclosed above may correspond to one or more workflows that each take the form of one or more operations to be carried out based on the predictive model's output. The one or more workflows may take various forms.

In one implementation, the one or more workflows may include a workflow to be carried out by the analytics platform 108 based on the predictive model's output. Examples of operations that may be part of such a workflow may include causing an output system or device to output an indication of a health metric for a given asset, causing an output system or device to output an indication of one or more recommended actions that may affect the health metric for the given asset, generating a work order to repair the given asset or a portion thereof, ordering a part for the given asset, and/or causing the given asset to modify an operation at the given asset via one or more commands, among other example operations.

In another implementation, the one or more workflows may include a workflow to be carried out by the asset 102 based on the predictive model's output. Examples of operations that may be part of such a workflow include an asset acquiring data according to a particular data-acquisition scheme, transmitting data to the analytics platform 108 according to a particular data-transmission scheme, executing a local diagnostic tool, and/or modifying an operating condition of the asset, among other example workflow operations.

A particular data-acquisition scheme may indicate how an asset acquires data. In particular, a data-acquisition scheme may indicate certain sensors and/or actuators from which the asset obtains data, such as a subset of sensors and/or actuators of the asset's plurality of sensors and actuators (e.g., sensors/actuators of interest). Further, a data-acquisition scheme may indicate an amount of data that the asset obtains from the sensors/actuators of interest and/or a sampling frequency at which the asset acquires such data. Data-acquisition schemes may include various other attributes as well. In a particular example implementation, a particular data-acquisition scheme may correspond to a predictive model for asset health and may be adjusted to acquire more data and/or particular data (e.g., from particular sensors) based on a decreasing asset health. Or a particular data-acquisition scheme may correspond to a leading-indicators predictive model and may be adjusted to a modify data acquired by asset sensors and/or actuators based on an increased likelihood of an occurrence of a leading indicator event that may signal that a subsystem failure might occur.

A particular data-transmission scheme may indicate how an asset transmits data to the analytics platform 108. Specifically, a data-transmission scheme may indicate a type of data (and may also indicate a format and/or structure of the data) that the asset should transmit, such as data from certain sensors or actuators, a number of data samples that the asset should transmit, a transmission frequency, and/or a priority-scheme for the data that the asset should include in its data transmission. In some cases, a particular data-acquisition scheme may include a data-transmission scheme or a data-acquisition scheme may be paired with a data-transmission scheme. In some example implementations, a particular data-transmission scheme may correspond to a predictive model for asset health and may be adjusted to transmit data less frequently based on an asset health that is above a threshold value. Other examples are also possible.

As suggested above, a local diagnostic tool may be a set of procedures or the like that are stored locally at an asset. The local diagnostic tool may generally facilitate diagnosing a cause of a fault or failure at an asset. In some cases, when executed, a local diagnostic tool may pass test inputs into a subsystem of an asset or a portion thereof to obtain test results, which may facilitate diagnosing the cause of a fault or failure. These local diagnostic tools are typically dormant on an asset and will not be executed unless the asset receives particular diagnostic instructions. Other local diagnostic tools are also possible. In one example implementation, a particular local diagnostic tool may correspond to a predictive model for health of a subsystem of an asset and may be executed based on a subsystem health that is at or below a threshold value.

Lastly, a workflow may involve modifying an operating condition of an asset. For instance, one or more actuators of an asset may be controlled to facilitate modifying an operating condition of the asset. Various operating conditions may be modified, such as a speed, temperature, pressure, fluid level, current draw, and power distribution, among other examples. In a particular example implementation, an operating-condition modification workflow may correspond to a predictive model for predicting whether an asset will complete a task on time and may cause the asset to increase its speed of travel based on a predicted completion percentage that is below a threshold value.

In general, defining a workflow such as those described above may involve selecting the appropriate workflow operation(s) to be taken and also defining the conditions that trigger such operation(s) based on the predictive model's output. These triggers may take various forms. As one example, a workflow trigger may take the form of a threshold value (or range of values) for the predictive model's output (e.g., a health metric below 10%). As another example, a workflow trigger may take the form of a threshold rate of change for the predictive model's output. As yet another example, a workflow trigger may take the form of a threshold amount of time that a predictive model's output has met a threshold value. Other examples are possible as well. Further, in some cases, a workflow may also have multiple triggers (e.g., multiple threshold values), each of which may cause a different action or actions to occur. It should also be understood that the one or more thresholds may be configurable.

A workflow such as those described above may be defined in a variety of manners. In one example, the workflow may be user defined. For instance, a user may operate a computing device that receives user inputs indicating selection of certain workflow operations and triggers, and the computing device may provide data indicating such selections to the analytics platform 108 and/or the asset 102 itself, which may then implement the user's definition of the workflow. As part of this process, the user may be able to access historical operating data to help select the appropriate workflow operation(s), define the triggers, or otherwise configure the workflow.

In another example, the corresponding workflow may be machine-defined. For instance, the analytics platform 108 may perform various functions, such as data analysis and/or simulations, to determine a workflow that may facilitate determining a cause of the probability output by the predictive model and/or preventing an occurrence of an event predicted by the model. While performing these functions, analytics platform 108 may rely on historical operating data to help select the appropriate workflow operation(s), define the triggers, or otherwise configure the workflow. Other examples of defining the corresponding workflow are also possible.

As with the predictive model described above, a workflow may either take the form of an aggregate workflow or an individualized workflow. In this respect, the analytics platform 108 could define an individualized workflow for the given asset using techniques similar to those described above for defining an individualized predictive model (e.g., by modifying an aggregate workflow based on one or more characteristics of the given asset).

Further, as with the predictive model, a workflow may be modified based on new asset data. For instance, based on new data received from assets or other data sources, the analytics platform 108 may modify an aggregate and/or individualized workflow. This modification function could be performed periodically (e.g., daily, weekly, monthly, etc.) and/or in response to some triggering event (e.g., the receipt of new historical data or the occurrence of an event). The workflow could be modified in other manners as well.

Still further, the analytics platform 108 may be configured to transmit an aggregate and/or individualized workflows to other devices and/or systems that then function to execute the workflow. As one possible example, the analytics platform 108 may transmit an aggregate and/or individualized workflow to any asset that is configured to locally execute the workflow (e.g., via a local analytics device or the like). The analytics platform 108 may be configured to perform this transmission periodically or based on triggering events, such as any modifications or updates to a predictive model.

It should be understood also that the workflows may be defined, individualized, and/or modified by devices and/or systems other than the analytics platform 108. For example, an asset may be configured to define, individualize, and/or modify a workflow (e.g., via a local analytics device, a central processing unit, or the like) either alone or in combination with the analytics platform 108. As noted above, the operation of a representative local analytics device is disclosed in further detail in U.S. application Ser. No. 14/963,207.

c. Executing Model-Workflow Pairs

Once a predictive model and corresponding workflow are defined, that model-workflow pair may then be then be deployed for runtime execution. Thereafter, the analytics platform 108, an asset (e.g., via a local analytics device, a central processing unit, or the like), or some combination thereof may use operating data to execute the model-workflow pair.

For instance, in one implementation, the analytics platform 108 may be configured to execute both the predictive model and the corresponding workflow. According to this implementation, the analytics platform 108 may receive operating data for a given asset, provide at least a portion of the operating data as input to the predictive model, and then execute the corresponding workflow based on the predictive model's output.

In another implementation, the analytics platform 108 may be configured to execute the predictive model for a given asset while the given asset itself may be configured to execute the corresponding workflow. According to this implementation, the analytics platform 108 may receive operating data for the given asset, provide at least a portion of the operating data as input to the predictive model, and then, based on the predictive model's output, signal to the given asset, which may in turn execute the corresponding workflow.

In yet another implementation, a given asset may be configured to execute the predictive model while the analytics platform 108 may be configured to execute the corresponding workflow. According to this implementation, the given asset may provide at least a portion of its operating data as input to the predictive model and then based on the predictive model's output signal to the analytics platform 108, which may in turn execute the corresponding workflow In still another implementation, a given asset may be configured to execute both the predictive model and the corresponding workflow. According to this implementation, the given asset may provide at least a portion of its operating data as input to the predictive model and then execute the corresponding workflow based on the predictive model's output.

Again, as noted above, the operation of a representative local analytics device is disclosed in further detail in U.S. application Ser. No. 14/963,207.

2. Other Workflows

In some embodiments, operating data for a given asset may also be used to define, modify, and execute other workflows related to asset operation that do not correspond to a predictive model. These workflows may take various forms.

One such workflow may take the form of a process for providing notifications based on operating data. For example, the analytics platform 108, an asset, or some combination thereof may execute a workflow that facilitates notifying users of certain abnormal-condition indicators (or certain combinations of abnormal-condition indicators) that have been generated for a given asset. As another example, the analytics platform 108, an asset, or some combination thereof may execute a workflow that notifies users when a given sensor value for the given asset satisfies a threshold condition that represents an anomalous value. These notifications may take various forms, examples of which may include alerts presented via a graphical user interface, emails, text messages, or the like.

Another such workflow may take the form of a process for sharing received operating data with other devices and/or systems. For instance, the analytics platform 108 may execute a workflow that relays operating data received from certain assets to one or more other analytics platforms. Various other workflows that are based on operating data may exist as well.

These other workflows may be defined, modified, and executed in a similar manner to the workflows described above that correspond to the predictive models.

C. Disregarding Unreliable Operating Data

As discussed above, there may be times when it is undesirable for the analytics platform 108 (and/or a local analytics device of an asset) to use operating data for an asset as it normally would, for example, in the process of defining, modifying, and/or executing model-workflow pairs or other workflows. Such times might be when assets are located at particular locations of interest, such as at repair shops, inside tunnels, etc., where assets tend to operate in a non-representative manner or otherwise generate unreliable data. Accordingly, when a given asset generates operating data while located within such a location of interest, it might be beneficial for the analytics platform 108 (and/or the given asset's local analytics device) to avoid using that operating data when handling predictive models related to the operation of the asset. After the given asset exits the location of interest, the analytics platform 108 and/or the local analytics platform of the given asset may resume using the operating data for the given asset as normal.

Figure 8:
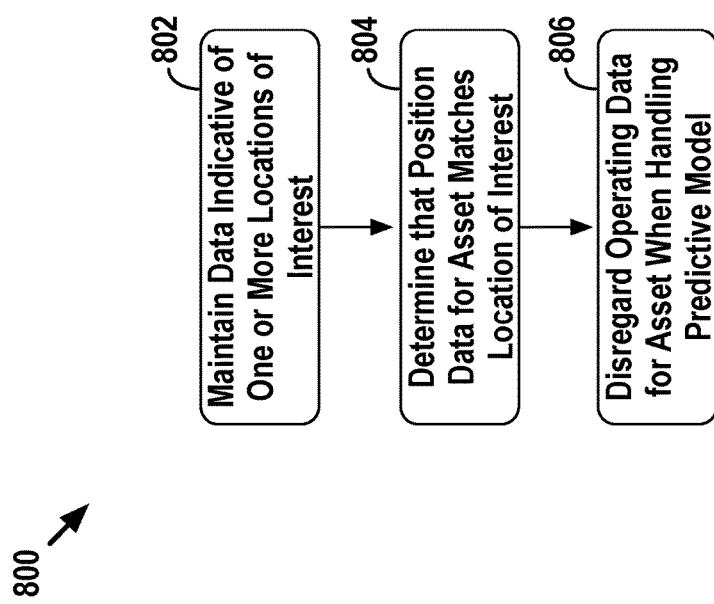
FIG. 8 depicts a flow diagram representing example operations that may be used for disregarding asset-operating data.

In general, disregarding unreliable operating data may be performed in a variety of manners. FIG. 8 depicts a flow diagram 800 of one possible example method for disregarding operating data for an asset based on position data for the asset. For purposes of illustration, the example method 800 is described as being carried out by an asset-monitoring system, but the method 800 may be carried out by other platforms, systems, and/or devices as well. One of ordinary skill in the art will appreciate that the method 800 is provided for sake of clarity and explanation and that numerous other combinations of operations may be utilized to disregard operating data.

As shown in FIG. 8, at block 802, the method 800 may involve maintaining data indicative of one or more locations of interest, each of which representing a location in which operating data from assets may be unreliable. At block 804, the method 800 may involve determining that position data for a particular asset (e.g., the asset 102) matches one of the locations of interest. At block 806, the method 800 may involve disregarding operating data for the particular asset when handling a predictive model related to the operation of a plurality of assets.

The functions of the example method 800 will now be described in further detail. Specifically, the method 800 is described as being carried out by an asset-monitoring system, which may take the form of the analytics platform 108 or the local analytics device of the asset 102. In certain embodiments, the analytics platform 108 and the local analytics device of the asset 102 may collaboratively perform the operations of the method 800. Other examples are also possible.

In any event, at block 802, the method 800 may involve the asset-monitoring system maintaining data indicative of one or more locations of interest. As noted above, a location of interest is a location where assets tend to generate operating data that is unreliable. That is, a location of interest is a location where assets generate operating data that might result in a non-representative handling of a model-workflow pair. As such, a location of interest represents a location in which operating data from assets should be disregarded.

In practice, a location of interest may be a single point in space or an area encompassing multiple points in space. For example, a location of interest that takes the form of a single point in space may be a geographic location that is identifiable by, for example, latitude and longitude coordinates, while a location of interest that takes the form of an area may be a geographic area that is identifiable by, for example, a metes and bounds description, multiple latitude and longitude coordinates, or some other boundary identifier. In a particular example, a location of interest may be identifiable by a geofence or the like. Other examples are also possible.

There are numerous examples of locations of interest. Some example types of locations of interest may include locations where malfunctioning assets congregate, locations where asset-operating conditions tend to become temporarily abnormal, and locations where assets operate in ideal (or near-ideal) contexts or are otherwise not placed under real-world stresses. Examples of locations where malfunctioning assets congregate may include repair shops or yards, asset testing facilities, and other locations where diagnostics are typically performed, among other examples. Examples of locations where asset-operating conditions tend to become temporarily abnormal may include tunnels or other locations where assets are confined, locations that include steep inclines or declines or other extreme terrain, and locations that include above or below average temperatures or other extreme environment conditions, among other examples. Examples of locations where assets operate in ideal or near-ideal contexts may include asset dealerships and the like, among other examples.

In any event, the asset-monitoring system maintaining data indicative of one or more locations of interest may be performed in a variety of manners. In example embodiments, this operation may involve the asset-monitoring system receiving data indicative of the one or more locations of interest and then storing such data in storage. In such embodiments, another device or system may define the locations of interest, which may then be provided to the asset-monitoring system.

For example, the asset-monitoring system may receive from a computing system or device a message identifying one or more locations of interest (e.g., one or more coordinate sets for each location of interest) and perhaps an indication that the locations are indeed locations of interest. In practice, a user may provide at the computing system or device inputs that identify the locations of interest. The computing system or device may then send a location of interest message based on those inputs to the asset-monitoring system, which may then maintain data indicative of the locations of interest identified in the message.

In another example, where the local analytics device of the asset 102 is performing the method 800, the local analytics device may maintain data indicative of the one or more locations of interest by receiving from the analytics platform 108 a location of interest message and storing in memory data indicative of the locations of interest identified in the message. Other examples are also possible.

In other example embodiments, the asset-monitoring system maintaining data indicative of the one or more locations of interest may involve the asset-monitoring system itself defining the one or more locations of interest and then storing data indicative of those defined locations of interest. In practice, the asset-monitoring system may define the locations of interest in a variety of manners.

For example, the asset-monitoring system may define locations of interest based at least on position data for a plurality of assets. In particular, the asset-monitoring system may perform this operation based on historical position data, current position data, or a combination thereof. In general, the asset-monitoring system defining the locations of interest based on asset-position data may involve inferring from the position data, and perhaps additional information associated with some of that position data (e.g., such as characteristics of the assets while located at the positions indicated by the position data), that a given location of interest exists, which may be performed in a variety of manners.

For instance, the asset-monitoring system may aggregate position data from a plurality of assets, analyze that aggregated position data to identify any locations where assets tend to "cluster," and then infer that these cluster locations correspond to locations of interest. More specifically, as assets operate, they may provide to the asset-monitoring system respective position data, which the asset-monitoring system may store in a database or the like. The assets may provide such data periodically, continuously, or based on certain triggering events, among other examples.

Figure 9A:
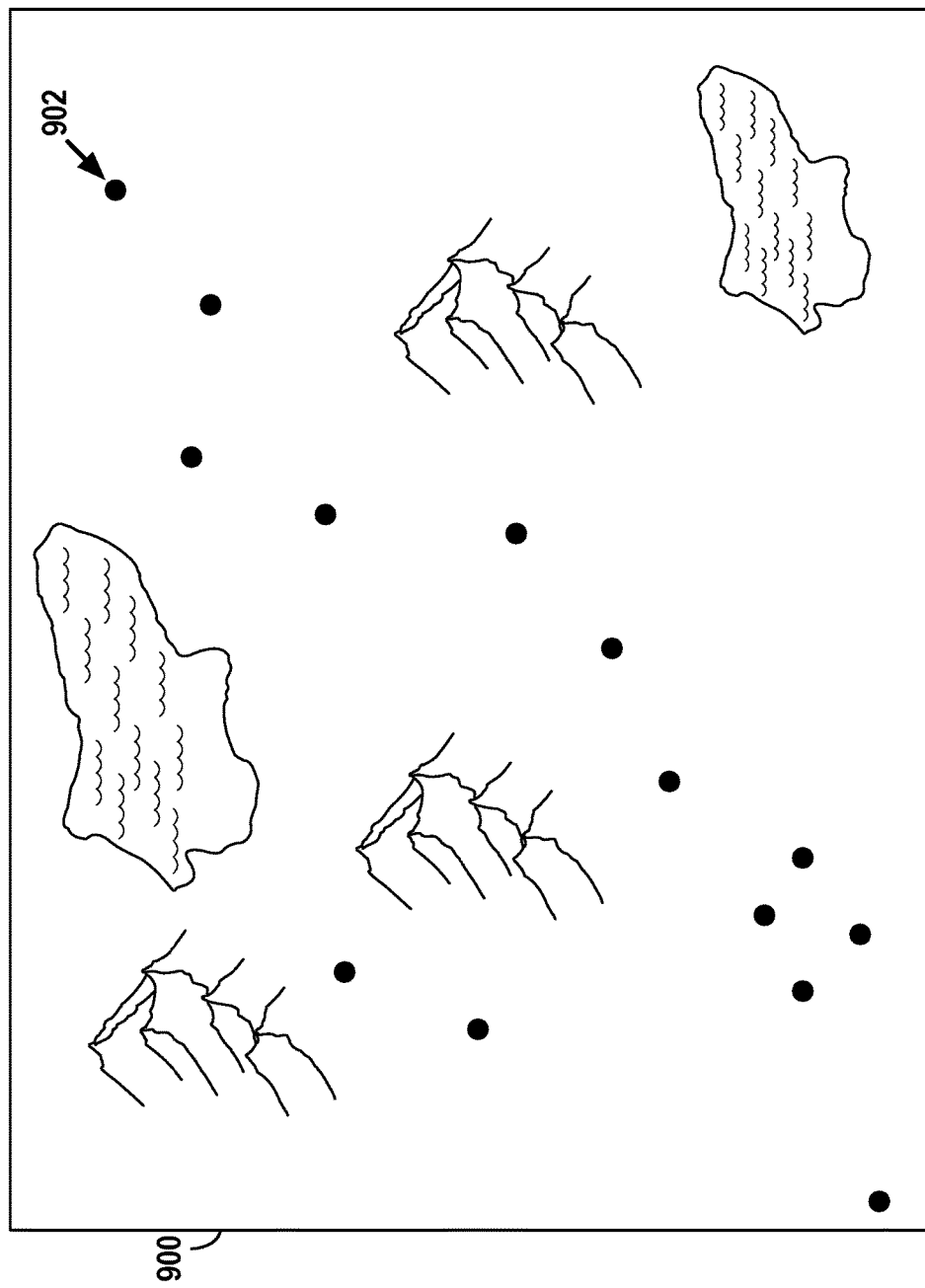
FIG. 9A depicts a conceptual illustration of historical asset-position data at a first point in time.
Figure 9B:
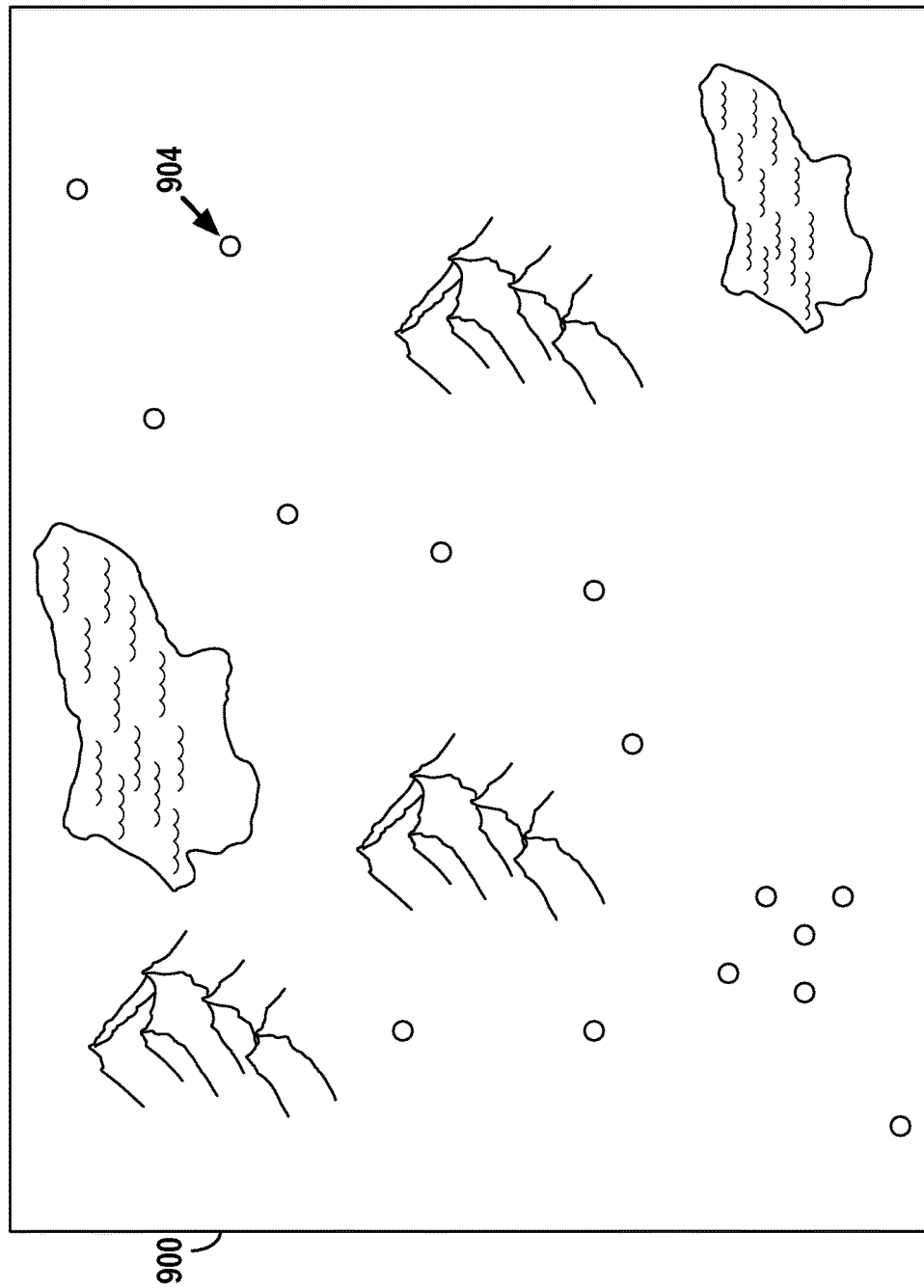
FIG. 9B depicts a conceptual illustration of historical asset-position data at a second point in time.
Figure 9C:
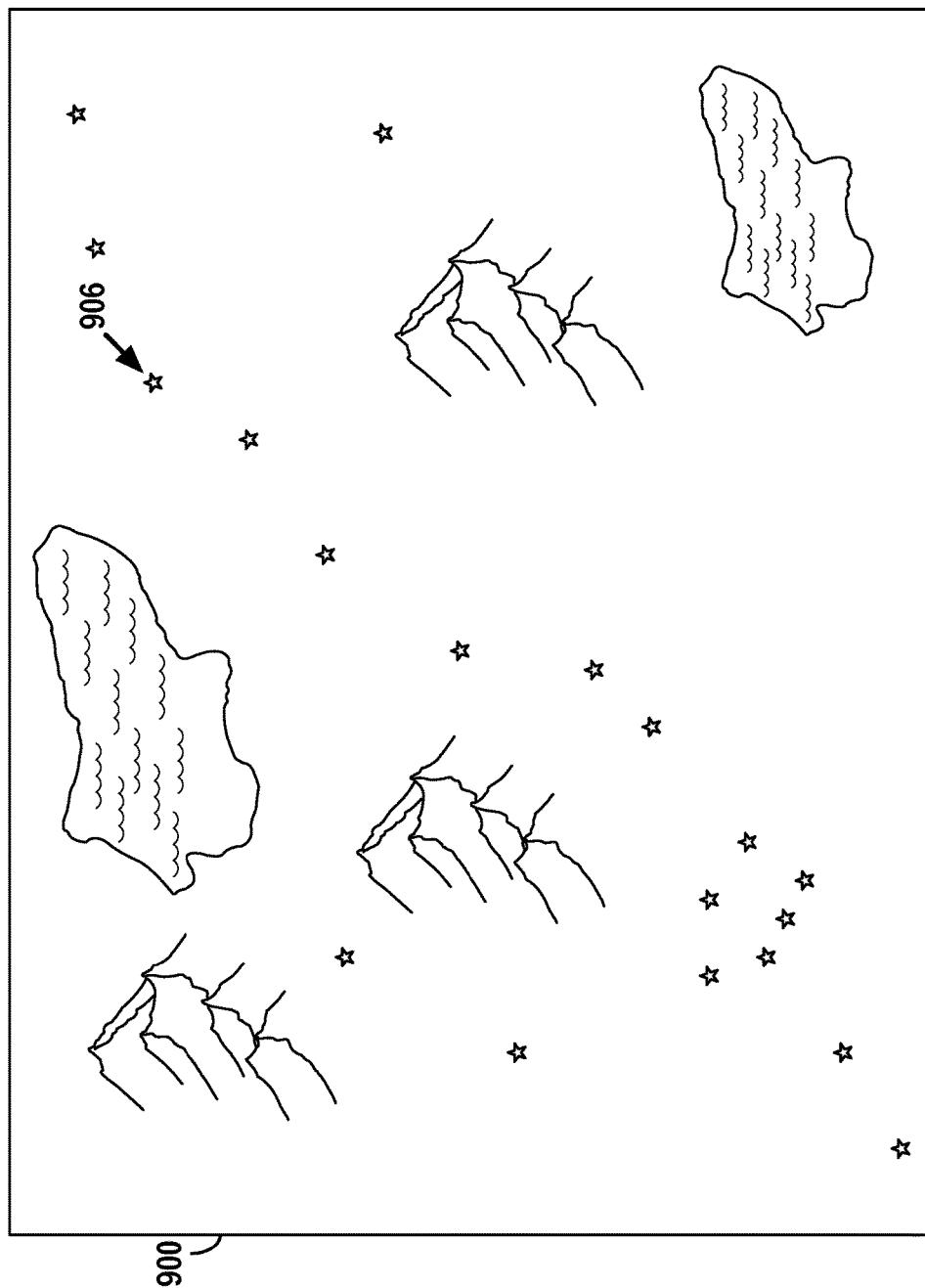
FIG. 9C depicts a conceptual illustration of historical asset-position data at a third point in time.

FIGS. 9A, 9B, and 9C show conceptual illustrations of asset-position data from various points in time that the asset-monitoring system may store. FIG. 9A shows an example geographic area 900 with asset-position data 902 from a first point in time. Each asset-position data 902 corresponds to a particular asset and represents that particular asset's location within the geographic area 900 at the first point in time. FIG. 9B shows the geographic area 900 with asset-position data 904 from a second point in time. Again, each asset-position data 904 corresponds to a particular asset and represents that particular asset's location within the geographic area 900 at the second point in time. Notably, the asset-position data 904 may correspond to one or more different assets than those that correspond to the asset-position data 902 from FIG. 9A. Similarly, FIG. 9C shows the geographic area 900 with asset-position data 906 from a third point in time. Each asset-position data 906 corresponds to a particular asset and represents that particular asset's location within the geographic area 900 at the third point in time. The asset-position data 906 may correspond to one or more different assets than those that correspond to the asset-position data 902 from FIG. 9A and/or the asset-position data 904 from FIG. 9B.

Based on the historical position data, the asset-monitoring system may identify any locations where assets historically cluster, which may be performed in a variety of manners. Generally, this operation may involve the asset-monitoring system determining locations where data points exceed a threshold density and/or where data points are within a threshold proximity to other data points, among other examples. In example embodiments, asset-monitoring system may perform clustering analysis on the historical position data to identify the locations where assets tend to cluster. Example cluster analysis may include executing connectivity models, distribution models, density models, and/or group models, among other cluster-related models.

Additionally or alternatively, a statistical classification technique, which utilizes a supervised learning algorithm, may be used to identify locations of interest. Example statistical classification algorithms may include linear classifiers, such as logistic regression and naive Bayes classifier, support vector machines, k-nearest neighbor classifier, random forest models, and learning vector quantization neural networks, among other statistical classification algorithms.

In practice, the asset-monitoring system may identify locations of interest using a statistical classification algorithm by analyzing data that may include some or all of the same operating data that is input to the predictive model, asset position data, and a response variable that is associated with the results of the predictive model. The response variable may be developed in a manner similar to that shown in FIG. 7. For instance, an identification may be made of times when the predictive model may have been operating in a non-representative manner (e.g., utilizing unreliable operating data). The response variable for these times and associated operating and position data is given a value of one. The response variable for all other times and positions is given a value of zero. The algorithm then analyzes this data to identify locations that are correlated with assets that temporarily operate in a non-representative manner. Other example response variables are also possible.

Figure 10:
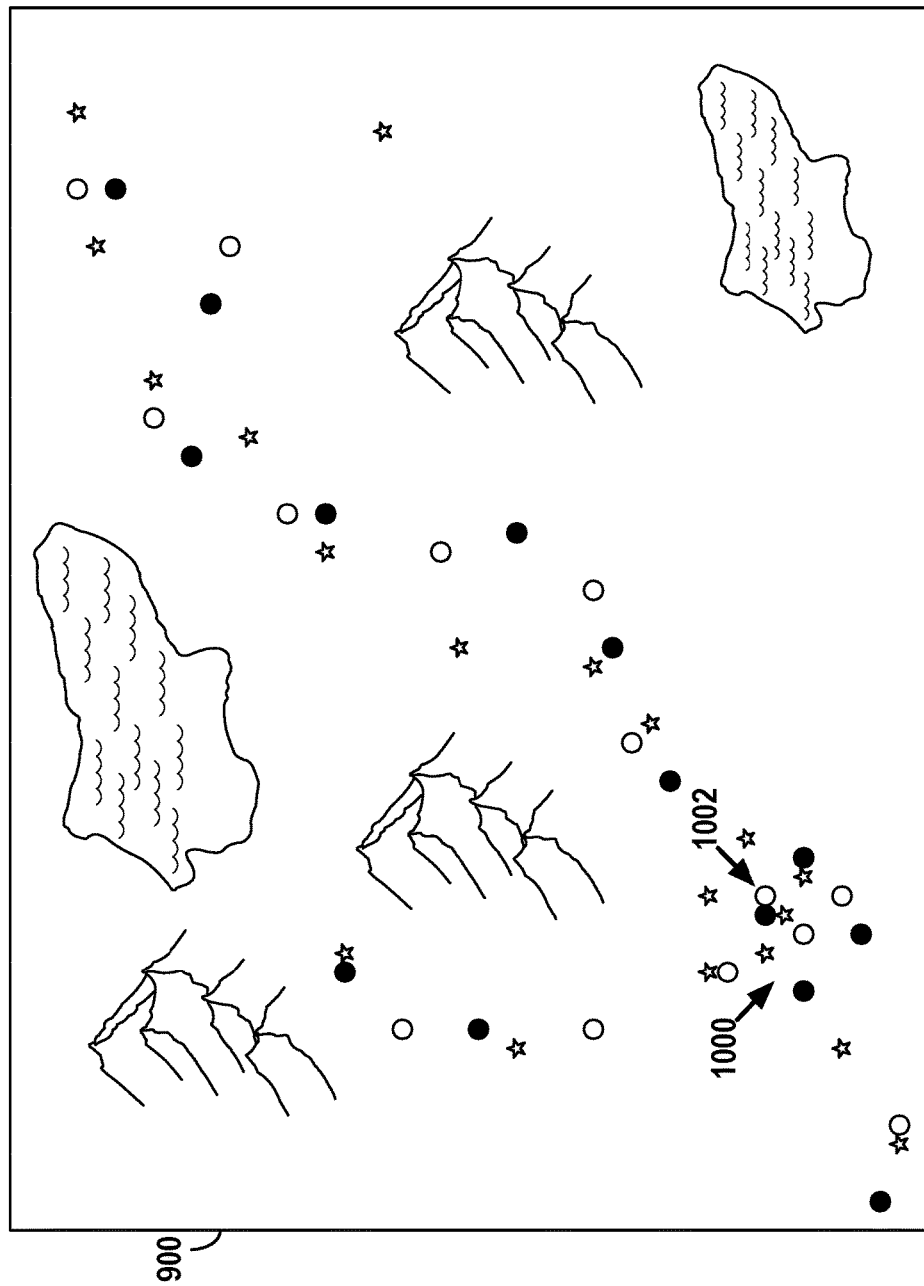
FIG. 10 depicts a conceptual illustration of aggregated asset-position data for use in defining a location of interest.

FIG. 10 shows a conceptual illustration of historical asset-position data that may be analyzed for any clusters. FIG. 10 shows the same geographic area 900 from FIGS. 9A-9C and includes the asset-position data 902, 904, and 906 from those FIGS. 9A, 9B, and 9C, respectively. The asset-monitoring system may analyze such aggregate historical asset-position data for any clusters using any of the techniques described above, which in this example may result in the asset-monitoring system identifying cluster 1000.

After the asset-monitoring system identifies any clusters, it may then define a location of interest based on a given cluster. This operation may be performed in a variety of manners. In one example, this operation may involve the asset-monitoring system determining whether the given cluster is associated with any information from which the asset-monitoring system may infer that the given cluster is a location of interest. For example, the information may indicate that the given cluster is in proximity to a location where a threshold number of asset parts are ordered or delivered within a threshold period of time, that assets tend to output a high number of abnormal-condition indicators while located about the given cluster, that assets tend to output the same or similar types of abnormal-condition indicators while located about the given cluster, or that assets with health metrics below a threshold value tend to congregate about the given cluster, among numerous other examples.

In any event, the asset-monitoring system may define a location of interest for each cluster in a variety of manners. Specifically, in one instance, the asset-monitoring system may define the location of interest as a point within the area covered by the various data points that define the cluster. This point may or may not correspond to an asset-position data point. In some such cases, the asset-monitoring system may further define the location of interest as an area around the point, such as a particular radius or the like about the point.

Figure 11:
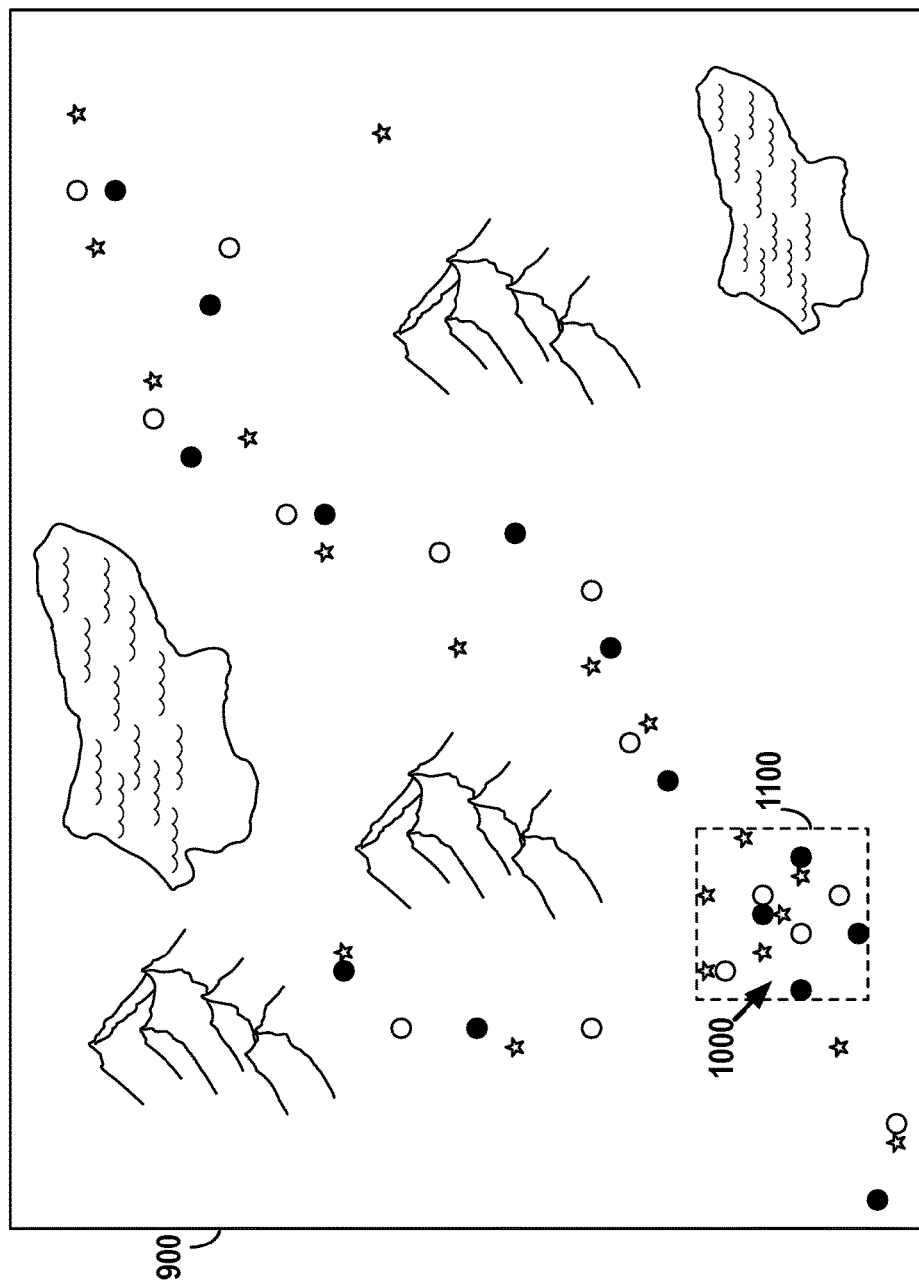
FIG. 11 depicts a conceptual illustration of aggregated asset-position data and a defined location of interest.

In other instances, the asset-monitoring system may define the location of interest as an area that circumscribes some or all of the data points that define the cluster. Such an area may take various shapes, such as a circle, square, rectangle, triangle, a free-form shape, etc. As one example, FIG. 11 shows a conceptual illustration of a defined location of interest. As shown, the FIG. 11 shows a location of interest 1100 defined as an area that circumscribes each asset-position data point that defines the cluster 1000. Other examples of defined locations of interest are also possible.

Additionally or alternatively, the asset-monitoring system defining a location of interest based on a given cluster may involve receiving from a computing system or device selection data that indicates the location of interest. More particularly, based on an identified cluster, the asset-monitoring system may cause a computing system (e.g., the output system 110) or device to display a suggestion that a location of interest likely exists at a location corresponding to the identified cluster. The computing system or device may then receive an input selection (e.g., from a user) that selects, outlines, or otherwise identifies a location that should be defined as a location of interest. For instance, a user may provide an input selection that outlines a geofence about the location from the suggestion. In any event, this input selection may then be provided to the asset-monitoring system, which then defines a location of interest based on the input selection.

The asset-monitoring system may define a location of interest in other manners as well. For example, the asset-monitoring system may define a location of interest based at least on an instance in which a given asset was at a particular location of interest. Specifically, the asset-monitoring system may determine an instance (e.g., date and/or time) when a given asset was known to be a particular location of interest. For example, based on repair-shop logs, the asset-monitoring system may determine that the asset 102 was being repaired at a repair yard on a given date. The asset-monitoring system may then determine the location of the given asset on that particular instance. For example, the asset-monitoring system may determine the asset 102's GPS coordinates on the given date.

The asset-monitoring system may then define a location of interest based on the determined location of the given asset on the particular instance. For example, in some embodiments, the asset-monitoring system may define a location of interest as the determined location of the given asset at the particular instance. Alternatively, the asset-monitoring system may use the determined location of the given asset as a starting point for a location of interest and then utilize other historical asset-position data to define the boundary of the location of interest.

To illustrate, returning to FIG. 10, asset-position data 1002 may correspond to the location of the asset 102 on the given date that the asset-monitoring system determined that the asset 102 was being repaired at a repair yard. The asset-monitoring system may then determine a boundary of the location of interest (e.g., repair yard) based on historical position data in proximity to the asset-position data 1002. In example implementations, data points within a threshold distance from the asset-position data 1002 may be utilized to define the boundary of the location of interest. Other examples are also possible.

In yet other example embodiments, the asset-monitoring system may define a location of interest based at least on abnormal-condition data produced by assets. For example, locations of interest may correspond to locations where assets tend to generate a relatively high number of abnormal-condition indicators and/or where a relatively high number of assets tend to generate abnormal-condition indicators. As such, it may be useful for the asset-monitoring system to identify locations where there is a "spike" in abnormal-condition activity.

Specifically, based on historical abnormal-condition data from a plurality of assets, the asset-monitoring system may determine assets' positions at which abnormal-condition indicators were triggered. Then, in a manner similar to the above discussion, the asset-monitoring system may define locations of interest as locations that correspond to relatively high concentrations of abnormal-condition activity. Other examples of defining locations of interest are also possible.

Returning to FIG. 8, at block 804, the method 800 may involve the asset-monitoring system determining that position data for a particular asset (e.g., the asset 102) matches one of the locations of interest defined at block 802. In practice, as discussed above, the asset-monitoring system may receive position data for a plurality of assets, and the asset-monitoring system may also receive, along with or separate from the position data, respective data corresponding to the received position data (e.g., operating data). In any event, based on the position data for the plurality of assets, the asset-monitoring system may determine whether any such position data matches any of the locations of interest. The asset-monitoring system may make this determination in a variety of manners.

For example, this operation may involve the asset-monitoring system receiving from the asset 102 (or from another system, such as a position system) position data that reflects the position of the asset 102 at a past or current time. In example embodiments, as discussed above, the position data may correspond to the position of the asset 102 when the asset 102 generated or otherwise collected operating data. In any event, based on this position data, the asset-monitoring system may then determine whether the position of the asset 102 matches any of the locations of interest.

In practice, the position of the asset 102 may be deemed to match a location of interest when the asset 102's position data corresponds to a location that is (1) equivalent to a location of interest (e.g., the asset 102's GPS coordinates are equivalent to those of the location of interest), (2) within the boundary of a location of interest (where the location of interest is defined as an area), or (3) within a threshold distance or other proximity of a location of interest (whether it is defined as a single point or area), among other examples.

In an example embodiment where the asset-monitoring system is the local analytics device of the asset 102, the local analytics device determining whether the position data of the asset 102 matches a location of interest may involve the local analytics device determining a position of the asset 102, for example, based on position data from the position unit of the asset 102. The local analytics device may then compare the asset 102's position to each location of interest stored in memory and determine whether the asset 102 is within the location of interest. Other examples are also possible.

Figure 12A:
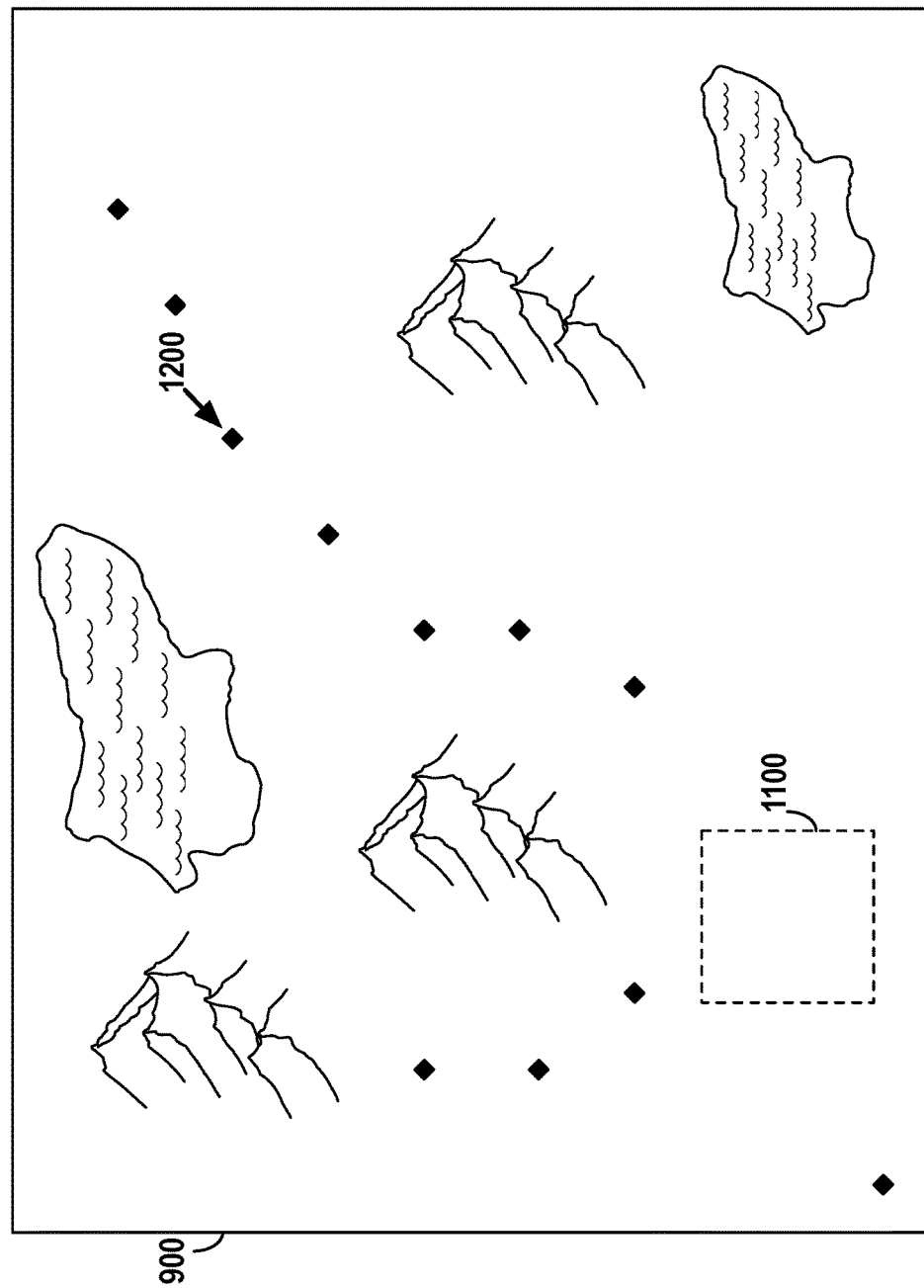
FIG. 12A depicts a conceptual illustration of a defined location of interest and asset-position data at a fourth point in time.
Figure 12B:
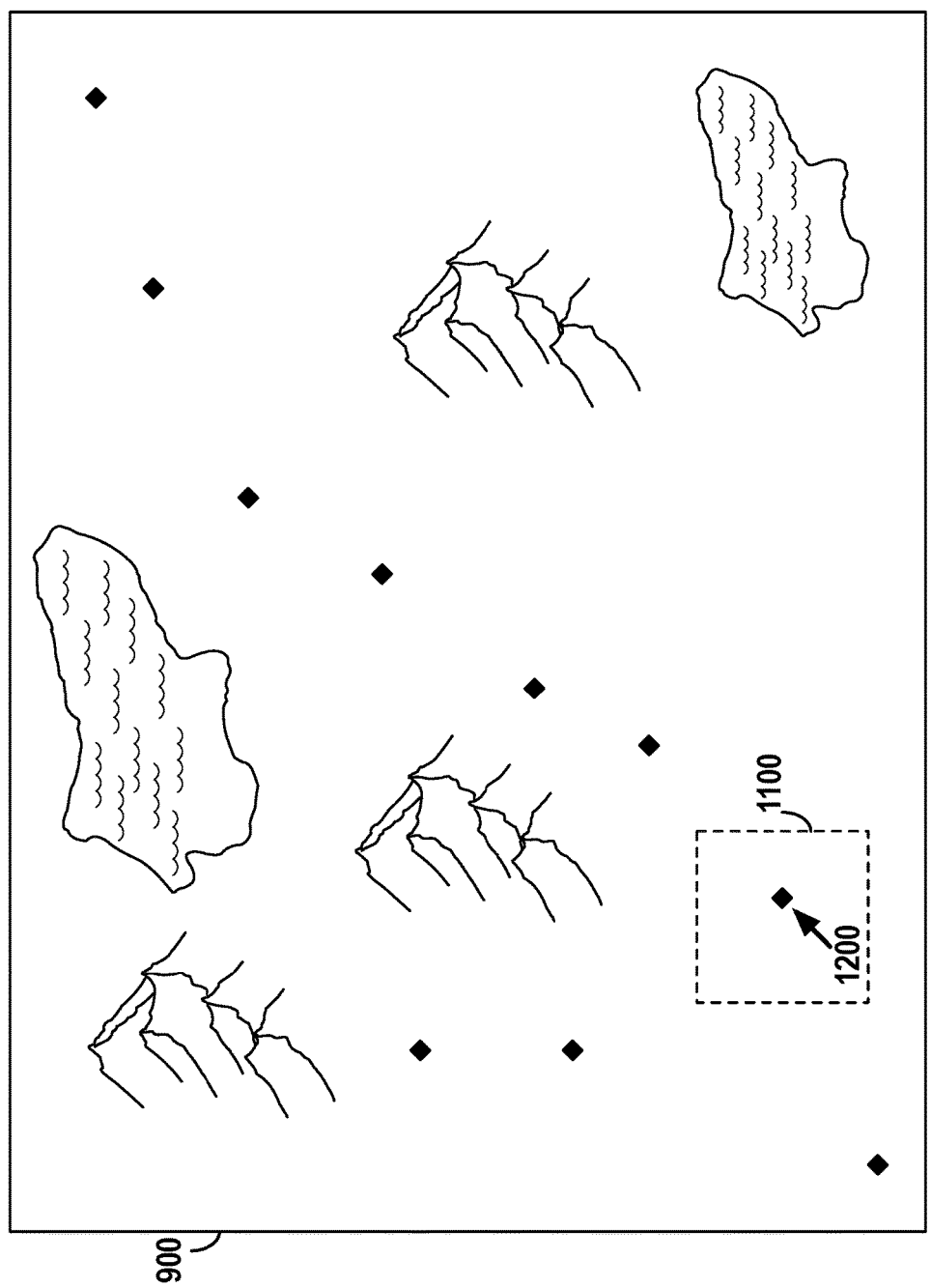
FIG. 12B depicts a conceptual illustration of a defined location of interest and asset-position data at a fifth point in time.
Figure 12C:
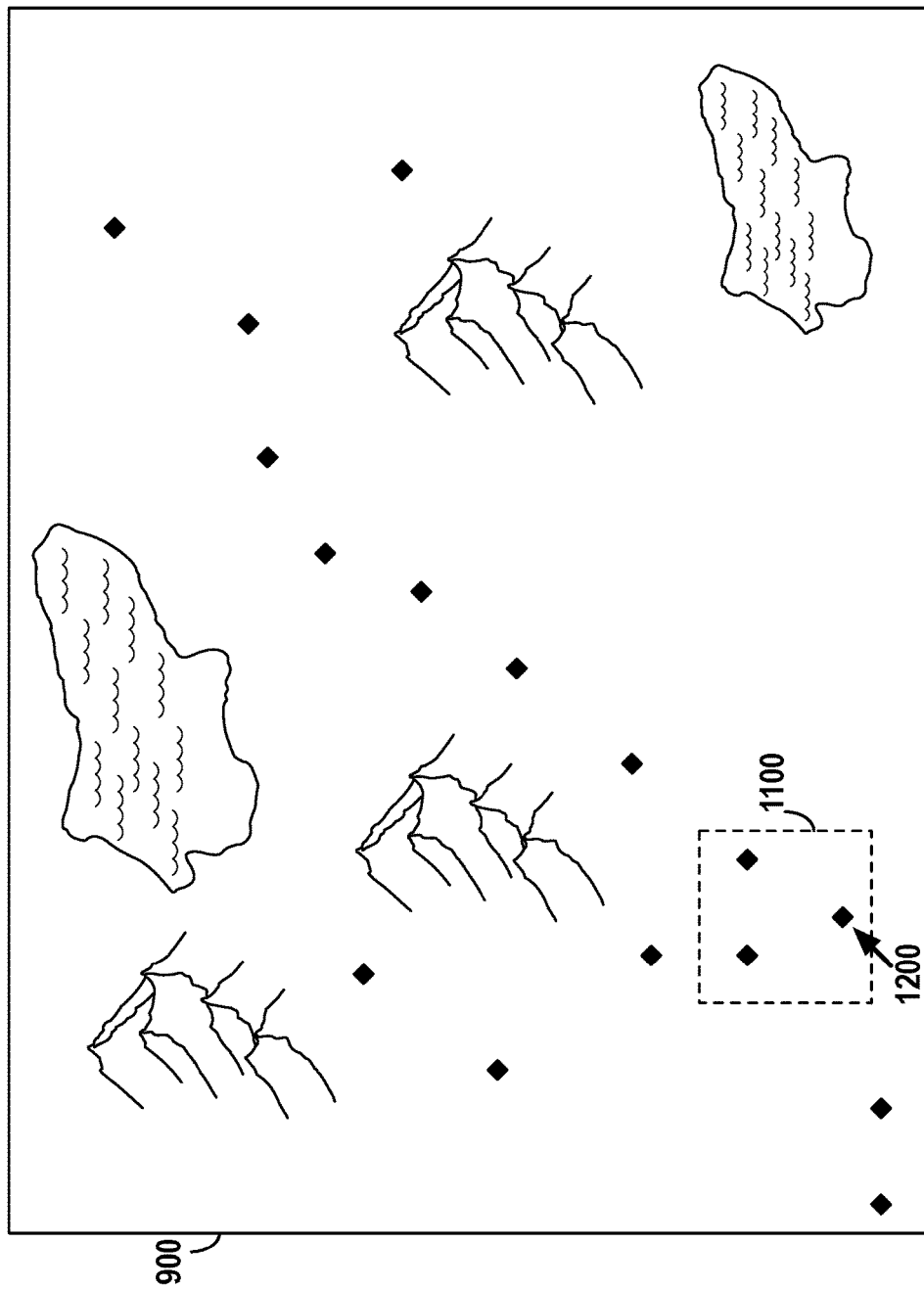
FIG. 12C depicts a conceptual illustration of a defined location of interest and asset-position data at a sixth point in time.

As an example, FIGS. 12A, 12B, and 12C show conceptual illustrations of asset-position data in relation to a defined location of interest at various points in time. As shown, the FIGS. 12A-12C each include the geographic area 900 from FIGS. 9A-9C and the defined location of interest 1100 from FIG. 11. Moreover, FIG. 12A includes asset-position data corresponding to a plurality of assets at a fourth point in time, including asset-position data 1200 corresponding to the asset 102. Based on such asset-position data, the asset-monitoring system would not determine that that asset 102 is within a location of interest.

FIG. 12B includes asset-position data corresponding to a plurality of assets at a fifth point in time, including asset-position data 1200 corresponding to the asset 102. As shown, now the asset-position data 1200 indicates an asset location within the location of interest 1100. Accordingly, based on the asset-position data 1200 of the asset 102, the asset-monitoring system would determine that the asset 102 is within a location of interest.

As another example, FIG. 12C includes asset-position data corresponding to a plurality of assets at a sixth point in time, including asset-position data 1200 corresponding to the asset 102. As shown, the asset 102 has moved relative to its position as represented in FIG. 12, but the asset-position data 1200 is still within the location of interest 1100. Accordingly, the asset-monitoring system would determine that the asset 102 is within a location of interest. Moreover, the asset-monitoring system would determine that two other assets are also within a location of interest.

In another example embodiment, the asset-monitoring system determining whether any position data matches any of the locations of interest may involve the asset-monitoring system receiving from the asset 102 an indication that the asset 102 is within a location of interest. In particular, the asset 102 may receive from, for example, the analytics platform 108, data identifying locations of interest, which the asset 102 may then store in memory. In operation, the asset 102 may monitor its current position and determine whether its current position is within any of the locations of interest. The asset 102 may then send to the asset-monitoring system a message when the asset 102 is within one of the locations of interest. Other examples of determining whether asset position data matches a location of interest are also possible.

At block 806, the method 800 may involve the asset-monitoring system disregarding operating data for the asset 102 when handling a predictive model related to the operation of a plurality of assets based on the determination at block 804. In practice, this operation may first involve the asset-monitoring system deciding to disregard operating data for the asset 102 when handling the predictive model in response to the determination at block 804 and then handling the predictive model in accordance with this decision, which may involve the asset-monitoring system disregarding operating data for the asset 102.

In practice, the decision to disregard operating data for the asset 102 may have a number of different scopes. For example, the asset-monitoring system may decide to disregard some or all operating data for the asset 102 that the asset-monitoring system receives after the decision (perhaps until the asset-monitoring system determines that the asset's position data no longer matches a location of interest), some or all operating data that it received before the decision, or some combination thereof. Additionally or alternatively, the asset-monitoring system may decide to disregard some or all operating data for the asset 102 that corresponds to the position data that triggered the decision. For example, as discussed above, position data may correspond to operating data (e.g., given position data may reflect where the asset 102 was located when given operating data was generated), and so, the decision may be to only disregard operating data corresponding to position data that matches a location of interest. Other examples of decisions are also possible.

The asset-monitoring system handling the predictive model related to the operation of assets in accordance with the decision may be performed in a variety of manners. For instance, before deciding to disregard operating data for the asset 102, the asset-monitoring system may have been operating such that it defines model-workflow pairs based on operating data for a group of assets that includes the asset 102 and/or modifies or execute model-workflow pairs based at least on operating data for the asset 102. After the decision, the asset-monitoring system may transition to operate such that the asset-monitoring system handles predictive models and/or corresponding workflows differently, among other differences.

For example, after the decision, the asset-monitoring system may disregard operating data for the asset 102 when handling the predictive model or otherwise forgo handling the predictive model based on the operating data for the asset 102. More specifically, before the decision, the asset-monitoring system may define a predictive model based on operating data for a plurality of assets including the asset 102, but after the decision, the asset-monitoring system may define a predictive model based on operating data for the plurality of assets but not operating data for the asset 102 (i.e., excluding the operating data for the asset 102).

Additionally or alternatively, before the decision, the asset-monitoring system may execute a predictive model for each asset of the plurality of assets based on respective operating data, but after the decision, the asset-monitoring system may execute a predictive model for each asset of the plurality of assets other than the asset 102 and forgo executing the predictive model for the asset 102. In implementations where the asset-monitoring system is the local analytics device of the asset 102, after the decision, the local analytics device may forgo executing the predictive model for the asset 102. Moreover, the local analytics device may forgo sending operating data to the analytics platform 108.

Additionally or alternatively, before the decision, the asset-monitoring system may update (e.g., modify) a predictive model based on operating data for one or more assets including the asset 102, but after the decision, the asset-monitoring system may update a predictive model based on operating data for the plurality of assets but not operating data for the asset 102 (i.e., excluding the operating data for the asset 102).

In practice, the feature of disregarding the operating data for the given asset when handling the predictive model may be implemented in various manners. For example, where the asset-monitoring system is the analytics platform 108, the data intake system of the analytics platform 108 may not ingest (e.g., block or otherwise filter out) operating data for the asset 102, the data intake system may ingest operating data for the asset 102 but may not pass such data to the data analysis system of the analytics platform 108, or the data analysis system may receive operating data for the asset 102 but may choose to forgo using such data as input to the predictive model related to the operation of assets. In examples where the asset-monitoring system is the local analytics device of the asset 102, the local analytics system may not ingest operating data from the asset 102, may ingest such data but may choose to forgo using such data as input to the predictive model, and/or may forgo transmitting operating data to the analytics platform 108. Other examples are also possible.

In any event, handling the predictive model in accordance with the decision to disregard operating data for the asset 102 may help the asset-monitoring system handle predictive models related to the operation of assets and corresponding workflows in a more desirable manner. For instance, the asset-monitoring system may disregard operating data for the asset 102 (and any other assets within any location of interest) that may be in a location where the asset 102 outputs unreliable data, thereby helping to maintain the integrity of the predictive model for the other assets and/or for future executions of the predictive model for the asset 102. Other advantages are also possible.

In some embodiments, the asset-monitoring system may additionally or alternatively handle other operations differently in response to determining that position data for the asset 102 matches a location of interest. For example, the asset-monitoring system may communicate with other systems in a different manner in response to the determination. In particular, before the determination, the asset-monitoring system may cause an output device or system (e.g., the output system 110) to output an abnormal-condition indicator (e.g., a fault code) based on the operating data from the asset 102 when such data indicates an abnormal condition is present at the asset 102 (e.g., when operating data of the asset 102 satisfies certain criteria). After the determination, the asset-monitoring system may cease causing (or forgo causing in the first instance) the output device or system to output the abnormal-condition indicator even when operating data from the asset 102 indicates an abnormal condition is present at the asset 102.

In another example, additionally or alternatively, the asset-monitoring system may disregard the operating data for some predictive models but utilize the operating data for other predictive models. For instance, in example embodiments, the asset-monitoring system may disregard the operating data for predictive models that are related to operation of assets (e.g., a health-metric predictive model or other predictive model related to assets' operation in the filed) but may utilize the operating data for predictive models related to performing repairs to assets (or other predictive models related to non-representative contexts for assets), such as a predictive model that helps to provide repair recommendations to mechanics or other repair personnel that fix assets. Other examples of how the asset-monitoring system may handle operations differently are also possible.

Sometime after deciding to handle the predictive model in accordance with the decision to disregard operating data for the asset 102, the asset-monitoring system may transition back to operating as before the decision. This transition may occur for a variety of reasons. For example, the asset-monitoring system may determine that the asset 102 has moved outside of the location of interest 1100 based on the asset 102's position data. In other examples, a temporal or other trigger may occur that causes the asset-monitoring system to transition back. Other examples are also possible.

V. Example Methods

Figure 13:
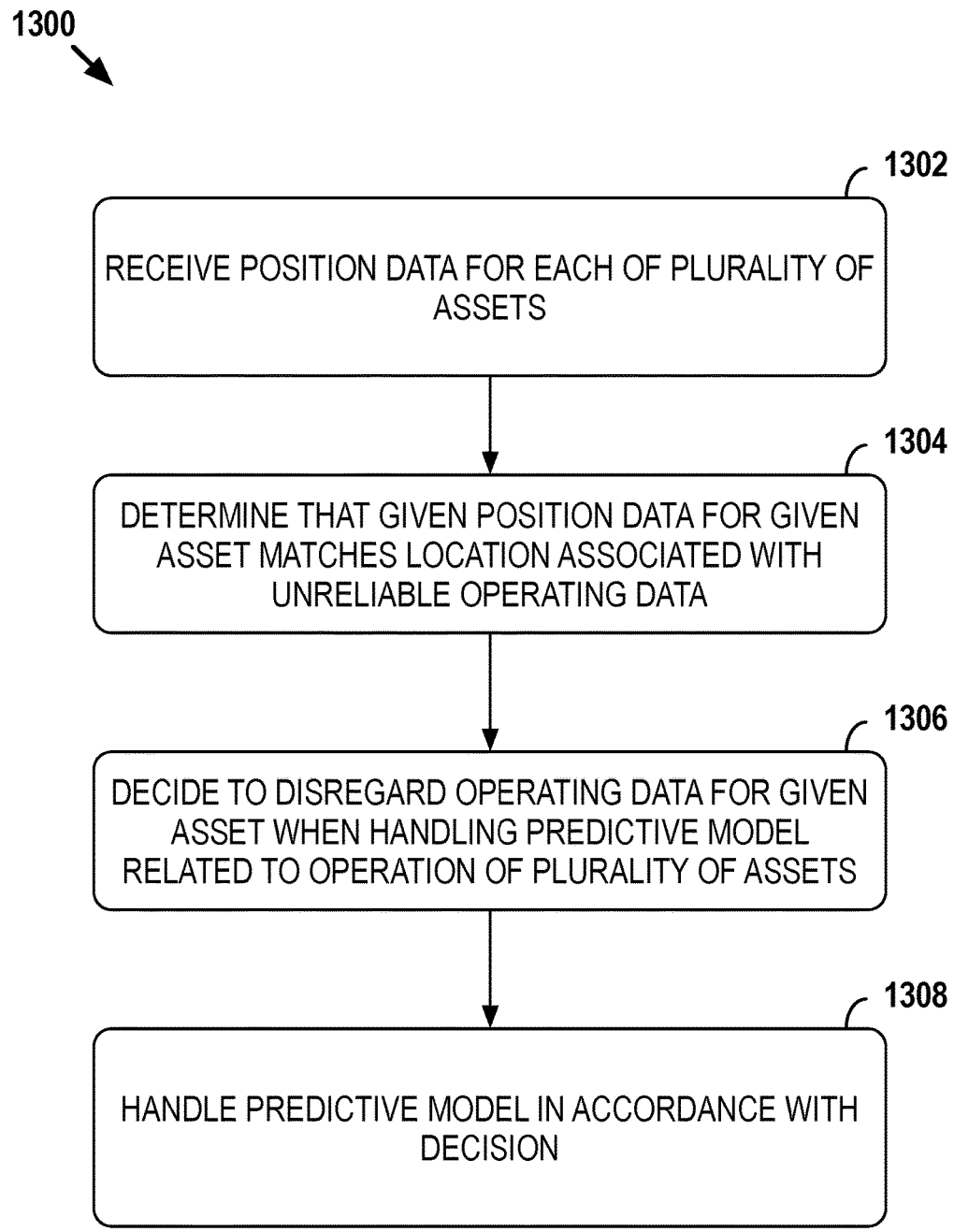
FIG. 13 depicts a flow diagram of an example method for handling operating data for an asset based on position data of the asset.

Turning now to FIG. 13, a flow diagram is depicted illustrating functions that can be carried out in accordance with an example method 1300 for handling operating data for an asset based on position data of the asset. For purposes of illustration only, these functions are described as being carried out by the analytics platform 108, but it should be understood that one or more of these functions may be carried out by other devices or systems. It should also be understood that certain functions could be added to this example method 1300 and/or that certain functions described below could be modified or removed from the example method 1300.

At block 1302, the method 1300 may involve the analytics platform 108 receiving, for each of a plurality of assets, position data. In some cases, the analytics platform 108 may also receive operating data corresponding to the position data (e.g., operating data generated by a given asset when located at a position indicated by the position data). At block 1304, the method 1300 may involve the analytics platform 108 determining that given position data for a given asset of the plurality of assets matches a location associated with unreliable operating data (e.g., a location of interest). At block 1306, the method 1300 may involve the analytics platform 108, in response to the determination from block 1304, deciding to disregard operating data for the given asset when handling a predictive model related to the operation of the plurality of assets. At block 1308, the method 1300 may involve the analytics platform 108 handling the predictive model in accordance with the decision made at block 1306.

Figure 14:
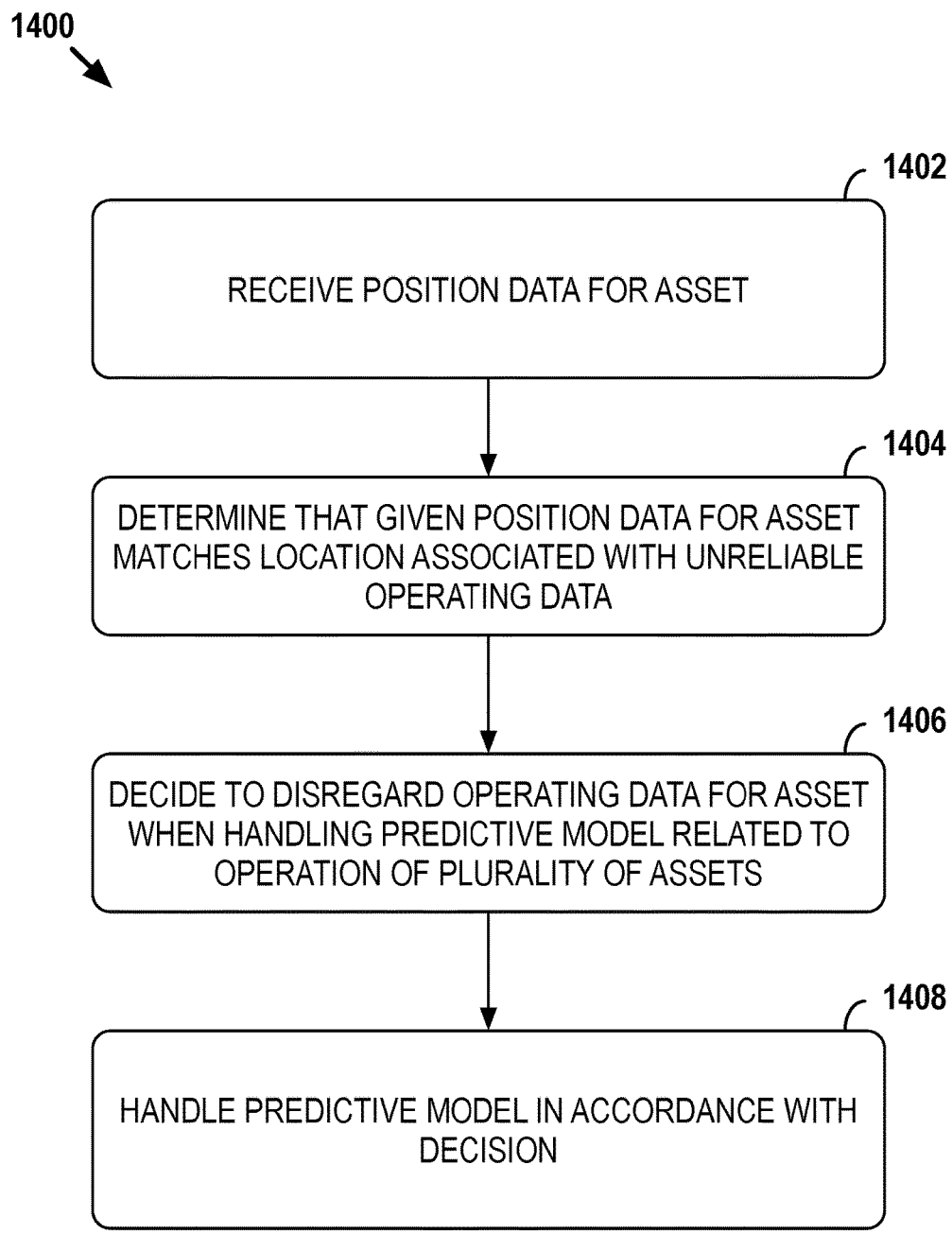
FIG. 14 depicts a flow diagram of another example method for handling operating data for an asset based on position data of the asset.

FIG. 14 shows a flow diagram illustrating functions that can be carried out in accordance with an example method 1400 for handling operating data for an asset based on position data of the asset. For purposes of illustration only, these functions are described as being carried out by the local analytics device of the asset 102, but it should be understood that one or more of these functions may be carried out by other devices or systems. It should also be understood that certain functions could be added to this example method 1400 and/or that certain functions described below could be modified or removed from the example method 1400.

At block 1402, the method 1400 may involve the local analytics device receiving, for the asset 102, position data. In some cases, the local analytics device may also receive operating data corresponding to the position data (e.g., operating data generated by the asset 102 when located at a position indicated by the position data). At block 1404, the method 1400 may involve the local analytics device determining that given position data for the asset matches a location associated with unreliable operating data (e.g., a location of interest). At block 1406, the method 1400 may involve the local analytics device, in response to the determination from block 1404, deciding to disregard operating data for the asset when handling a predictive model related to the operation of a plurality of assets, including the asset 102. At block 1408, the method 1400 may involve the local analytics device handling the predictive model in accordance with the decision made at block 1406.

VI. Conclusion

Example embodiments of the disclosed innovations have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans", "operators", "users" or other entities, this is for purposes of example and explanation only. The claims should not be construed as requiring action by such actors unless explicitly recited in the claim language.

The invention claimed is:

1. A computing system comprising:
   at least one processor;
   a non-transitory computer-readable medium; and
   program instructions stored on the non-transitory computer-readable medium that are executable by the at least one processor to cause the computing system to:
   receive, for each of a plurality of assets, position data;
   determine that given position data for a given asset of the plurality of assets matches a location associated with unreliable operating data;
   in response to the determination, decide to disregard operating data for the given asset when handling a predictive model related to the operation of the plurality of assets; and
   handle the predictive model in accordance with the decision.

2. The computing system of claim 1, further comprising program instructions stored on the non-transitory computer-readable medium that are executable by the at least one processor to cause the computing system to:
   receive, for each of the plurality of assets, operating data corresponding to the position data.

3. The computing system of claim 2, wherein the program instructions stored on the non-transitory computer-readable medium that are executable by the at least one processor to cause the computing system to handle the predictive model in accordance with the decision comprise program instructions stored on the non-transitory computer-readable medium that are executable by the at least one processor to cause the computing system to define the predictive model based on a set of received operating data for the plurality of assets that excludes the operating data corresponding to the given position data for the given asset.

4. The computing system of claim 2, wherein the predictive model is previously defined by the computing system, and wherein the program instructions stored on the non-transitory computer-readable medium that are executable by the at least one processor to cause the computing system to handle the predictive model in accordance with the decision comprise program instructions stored on the non-transitory computer-readable medium that are executable by the at least one processor to cause the computing system to modify the predictive model based on a set of received operating data for the plurality of assets that excludes the operating data corresponding to the given position data for the given asset.

5. The computing system of claim 1, wherein the program instructions stored on the non-transitory computer-readable medium that are executable by the at least one processor to cause the computing system to handle the predictive model in accordance with the decision comprise program instructions stored on the non-transitory computer-readable medium that are executable by the at least one processor to cause the computing system to forgo execution of the predictive model for the given asset.

6. The computing system of claim 1, wherein the location associated with unreliable operating data is a first location, and wherein the computing system further comprises program instructions stored on the non-transitory computer-readable medium that are executable by the at least one processor to cause the computing system to:
   before the determination, define one or more locations associated with unreliable operating data, wherein the one or more locations comprise the first location.

7. The computing system of claim 6, wherein the program instructions stored on the non-transitory computer-readable medium that are executable by the at least one processor to cause the computing system to define the one or more locations comprise program instructions stored on the non-transitory computer-readable medium that are executable by the at least one processor to cause the computing system to define the one or more locations based at least on historical position data for one or more of the plurality of assets.

8. The computing system of claim 1, wherein the program instructions stored on the non-transitory computer-readable medium that are executable by the at least one processor to cause the computing system to determine that the given position data for the given asset of the plurality of assets matches the location associated with unreliable operating data comprise program instructions stored on the non-transitory computer-readable medium that are executable by the at least one processor to cause the computing system to determine that the given position data corresponds to a position that is within a threshold distance of the location associated with unreliable operating data.

9. The computing system of claim 1, further comprising program instructions stored on the non-transitory computer-readable medium that are executable by the at least one processor to cause the computing system to:
   before the determination, cause a computing device to output an indication of an abnormal condition when operating data for the given asset satisfies particular criteria; and
   in response to the determination, forgo causing the computing device to output the indication of the abnormal condition when operating data for the given asset satisfies the particular criteria.

10. A non-transitory computer-readable medium having instructions stored thereon that are executable to cause a computing system to:
    receive, for each of a plurality of assets, position data;
    determine that given position data for a given asset of the plurality of assets matches a location associated with unreliable operating data;
    in response to the determination, decide to disregard operating data for the given asset when handling a predictive model related to the operation of the plurality of assets; and
    handle the predictive model in accordance with the decision.

11. The non-transitory computer-readable medium of claim 10, further comprising instructions stored on the non-transitory computer-readable medium that are executable to cause the computing system to:
receive, for each of the plurality of assets, operating data corresponding to the position data.

12. The non-transitory computer-readable medium of claim 11, wherein the instructions stored on the non-transitory computer-readable medium that are executable to cause the computing system to handle the predictive model in accordance with the decision comprise instructions stored on the non-transitory computer-readable medium that are executable to cause the computing system to define the predictive model based on a set of received operating data for the plurality of assets that excludes the operating data corresponding to the given position data for the given asset.

13. The non-transitory computer-readable medium of claim 11, wherein the predictive model is previously defined by the computing system, and wherein the instructions stored on the non-transitory computer-readable medium that are executable to cause the computing system to handle the predictive model in accordance with the decision comprise instructions stored on the non-transitory computer-readable medium that are executable to cause the computing system to modify the predictive model based on a set of received operating data for the plurality of assets that excludes the operating data corresponding to the given position data for the given asset.

14. The non-transitory computer-readable medium of claim 10, wherein the instructions stored on the non-transitory computer-readable medium that are executable to cause the computing system to handle the predictive model in accordance with the decision comprise instructions stored on the non-transitory computer-readable medium that are executable to cause the computing system to forgo execution of the predictive model for the given asset.

15. The non-transitory computer-readable medium of claim 10, further comprising instructions stored on the non-transitory computer-readable medium that are executable to cause the computing system to:
before the determination, cause a computing device to output an indication of an abnormal condition when operating data for the given asset satisfies particular criteria; and
in response to the determination, forgo causing the computing device to output the indication of the abnormal condition when operating data for the given asset satisfies the particular criteria.

16. A computer-implemented method comprising:
receiving, by a computing system for each of a plurality of assets, position data;
determining, by the computing system, that given position data for a given asset of the plurality of assets matches a location associated with unreliable operating data;
in response to the determination, deciding, by the computing system, to disregard operating data for the given asset when handling a predictive model related to the operation of the plurality of assets; and
handling, by the computing system, the predictive model in accordance with the decision.

17. The computer-implemented method of claim 16, wherein the location associated with unreliable operating data is a first location, and wherein the method further comprises:
before the determination, defining, by the computing system, one or more locations associated with unreliable operating data, wherein the one or more locations comprise the first location.

18. The computer-implemented method of claim 17, wherein defining the one or more locations comprises defining the one or more locations based at least on historical position data for one or more of the plurality of assets.

19. The computer-implemented method of claim 16, wherein determining that the given position data for the given asset of the plurality of assets matches the location associated with unreliable operating data comprises determining that the given position data corresponds to a position that is within a threshold distance of the location associated with unreliable operating data.

20. The computer-implemented method of claim 16, wherein handling the predictive model in accordance with the decision comprises at least one of (a) defining the predictive model using a set of received operating data for the plurality of assets that excludes operating data for the given asset corresponding to the given position data for the given asset, (b) modifying the predictive model using a set of received operating data for the plurality of assets that excludes operating data for the given asset corresponding to the given position data for the given asset, or (c) forgoing execution of the predictive model for the given asset.

* * * * *